US012317398B2

(12) United States Patent
Ji et al.

(10) Patent No.: US 12,317,398 B2
(45) Date of Patent: May 27, 2025

(54) OVEN INCLUDING PLURAL ANTENNAS AND METHOD FOR CONTROLLING THE SAME

(71) Applicant: LG Electronics Inc., Seoul (KR)

(72) Inventors: Jongseong Ji, Seoul (KR); Sunghun Sim, Seoul (KR); Junghyeong Ha, Seoul (KR); Chaehyun Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 834 days.

(21) Appl. No.: 17/010,939

(22) Filed: Sep. 3, 2020

(65) Prior Publication Data

US 2021/0321497 A1 Oct. 14, 2021

(30) Foreign Application Priority Data

Apr. 8, 2020 (KR) ........................ 10-2020-0042823

(51) Int. Cl.
*H05B 6/72* (2006.01)
*F24C 7/02* (2006.01)
(Continued)

(52) U.S. Cl.
CPC ................. *H05B 6/72* (2013.01); *F24C 7/02* (2013.01); *F24C 7/085* (2013.01); *H05B 6/6447* (2013.01); *H05B 6/687* (2013.01)

(58) Field of Classification Search
CPC ........ H05B 6/72; H05B 6/6447; H05B 6/687; H05B 6/686; H05B 6/70; H05B 6/68;
(Continued)

(56) References Cited

U.S. PATENT DOCUMENTS 9,717,116 B2 * 7/2017 Niklasson ............ H05B 6/6488
2010/0243645 A1 * 9/2010 Ishizaki ................. H05B 6/705
219/721

(Continued)

FOREIGN PATENT DOCUMENTS

EP 2485565 8/2012
EP 3324705 5/2018

(Continued)

OTHER PUBLICATIONS

EP Extended European Search Report in European Appln. No. 20206756.7, dated Apr. 7, 2021, 11 pages.

*Primary Examiner* — Hung D Nguyen
*Assistant Examiner* — Thao Uyen Tran-Le
(74) *Attorney, Agent, or Firm* — Fish & Richardson P.C.

(57) ABSTRACT

An oven includes a housing that defines a cavity therein, a radio wave generator coupled to the housing and configured to generate a radio wave to be transmitted to the cavity, a control unit electrically connected to the radio wave generator and configured to determine radio wave information related to an intensity, a phase, and a frequency of the radio wave to be generated by the radio wave generator, and a plurality of antennas electrically connected to the radio wave generator and configured to allow the radio wave to be radiated into the cavity. The plurality of antennas are spaced apart from one another, and the control unit is configured to determine the radio wave information for each of the plurality of antennas.

9 Claims, 10 Drawing Sheets

(51) Int. Cl.
*F24C 7/08* (2006.01)
*H05B 6/64* (2006.01)
*H05B 6/68* (2006.01)

(58) Field of Classification Search
CPC ......... H05B 6/6467; H05B 6/725; F24C 7/02; F24C 7/085; H01Q 1/24
See application file for complete search history.

(56) References Cited

U.S. PATENT DOCUMENTS

| | | | | |
|---|---|---|---|---|
| 2011/0204043 | A1* | 8/2011 | Ishizaki ................. | H05B 6/705 219/647 |
| 2012/0067872 | A1* | 3/2012 | Libman .................. | H05B 6/688 219/702 |
| 2012/0067873 | A1* | 3/2012 | Mihara .................. | H05B 6/686 219/704 |
| 2012/0103972 | A1* | 5/2012 | Okajima ................ | H05B 6/686 219/490 |
| 2014/0360380 | A1* | 12/2014 | Kishira .................. | H05B 6/645 99/331 |
| 2015/0271877 | A1* | 9/2015 | Johansson ............. | H05B 6/686 219/750 |
| 2016/0249416 | A1* | 8/2016 | Elboim .................... | H05B 6/68 |
| 2017/0071036 | A1* | 3/2017 | Hunter, Jr. ............. | H05B 6/686 |
| 2018/0249855 | A1 | 9/2018 | Carcano et al. | |
| 2019/0254127 | A1* | 8/2019 | Ma ......................... | H05B 6/664 |
| 2020/0053843 | A1* | 2/2020 | Otsuki ..................... | H05B 6/72 |

FOREIGN PATENT DOCUMENTS

| | | | |
|---|---|---|---|
| KR | 100889108 | 3/2009 | |
| KR | 1020170043230 | 4/2017 | |
| WO | WO2016166695 | 10/2016 | |
| WO | WO2018125143 | 7/2018 | |
| WO | WO-2019165601 A1 * | 9/2019 | ............ H04W 24/08 |

* cited by examiner

OVEN INCLUDING PLURAL ANTENNAS AND METHOD FOR CONTROLLING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0042823, filed on Apr. 8, 2020, the contents of which are incorporated by reference herein in their entirety.

TECHNICAL FIELD

The present disclosure relates to an oven including a plurality of antennas and a method for controlling the same, and more particularly, an oven capable of independently controlling a plurality of antennas radiating radio waves for heating an accommodated cooking material, and a method for controlling the same.

BACKGROUND

An oven is a cooking appliance designed to warm (or cook) a cooking material (e.g., food) put in a sealed inner space (cavity) by applying heat.

For example, the oven may heat a cooking material by using microwaves, infrared rays, or convection.

In some examples, an oven may include a microwave oven (or microwave range). The microwave ovens may have a simple structure and provide ease of use.

In some cases, an oven may include a magnetron for generating microwaves, and a waveguide for guiding the generated microwaves to a cavity. A cooking material contained in the cavity may be heated by the microwaves.

In some cases, the magnetron may only generate microwaves with a fixed frequency. As the cooking material is heated, an amount of microwaves that penetrate the cooking material may be decreased.

A cooking material may have an asymmetric three-dimensional shape. Sometimes, it may be difficult to expect the cooking material to be evenly cooked from all sides by the oven. In some cases, the oven may include a turn-table and rotate the turn-table on which the cooking material is placed.

In some cases, ovens may have a structure without turning a table for baking or the like to avoid uneven heating of the cooking material.

In some cases, as the cooking material is heated, physical and chemical properties of the cooking material may be changed. Accordingly, a frequency of microwaves at which the microwaves effectively penetrate the cooking material may also be changed.

In some cases, where the microwaves produced by the magnetron have the fixed frequency, it may be difficult to actively respond to changes in the state of the cooking material.

In some cases, an oven may have operation modes that are divided into a rapid cooking mode, a microwave cooking mode, and a convection/grill mode, and a cooking material may be heated in each mode in various manners.

For example, when the oven is operated in the rapid cooking mode, the rapid cooking may be achieved by utilizing both radiant heat and microwave elements.

In some cases, a cooking apparatus may include a transmitting antenna for radiating electromagnetic waves to an object to be cooked or food, a receiving antenna for receiving reflected electromagnetic waves, and a control unit for determining a temperature of the food using the received electromagnetic waves, and a control method thereof.

The cooking apparatus and its control method may only provide the temperature of the food, which may be insufficient to provide a satisfactory cooking result of food.

In some cases, the transmitting antenna and the receiving antenna may be separately provided in a space additionally defined for separately providing antennas for performing different functions.

SUMMARY

The present disclosure describes an oven having a structure capable of evenly cooking a cooking material from all sides, and a method of controlling the same.

The present disclosure also describes an oven having a structure capable of helping to prevent damage to a member provided for cooking a cooking material, and a method of controlling the same.

The present disclosure further describes an oven having a structure capable of effectively cooking a cooking material during a cooking process, and a method of controlling the same.

The present disclosure further describes an oven having a structure capable of accurately recognizing (determining) a degree to which a cooking material is to be cooked during a cooking process, and a method of controlling the same.

The present disclosure further describes an oven having a structure capable of facilitating a control of a member provided for cooking a cooking material, and a method of controlling the same.

The present disclosure further describes an oven having a structure capable of reducing a size of the oven, and a method of controlling the same.

According to one aspect of the subject matter described in this application, an oven includes a housing that defines a cavity therein, a radio wave generator coupled to the housing and configured to generate a radio wave to be transmitted to the cavity, a control unit electrically connected to the radio wave generator and configured to determine radio wave information related to an intensity, a phase, and a frequency of the radio wave to be generated by the radio wave generator, and a plurality of antennas electrically connected to the radio wave generator and configured to allow the radio wave to be radiated into the cavity. The plurality of antennas are spaced apart from one another, and the control unit is configured to determine the radio wave information for each of the plurality of antennas.

Implementations according to this aspect may include one or more of the following features. For example, the control unit may be further configured to detect a radiation intensity, a radiation phase, and a radiation frequency of a radiation radio wave that is radiated into the cavity through each of the plurality of antennas, and to detect a reflection intensity, a reflection phase, and a reflection frequency of a reflection radio wave that is reflected from the cavity in response to radiation of the radiation radio wave through each of the plurality of antennas.

In some implementations, the control unit may be further configured to determine a reflection ratio at a specific frequency based on the detected radiation intensity of the radiation radio wave and the detected reflection intensity of the reflection radio wave. In some examples, the control unit may be further configured to compare the reflection ratio to a reference reflection ratio, and to determine the frequency of the radio wave to be radiated into the cavity based on a result of the comparison. In some examples, the control unit may be further configured to, based on the determined reflection ratio being greater than or equal to a reference reflection ratio, determine a reference frequency as the frequency of the radio wave to be radiated into the cavity.

In some implementations, the control unit may be further configured to determine a number of times that the determined reflection ratio is greater than or equal to the reference reflection ratio, and based on the number of times exceeding a reference number of times, determine the reference frequency as the radio wave to be radiated into the cavity.

In some implementations, where the plurality of antennas include a first antenna and a second antenna spaced apart from each other, the control unit may be configured to, based on a first radiation radio wave being radiated through the first antenna, detect a first radiation intensity, a first radiation phase, and a first radiation frequency of the first radiation radio wave, and to detect a first reflection intensity, a first reflection phase, and a first reflection frequency of a first reflection radio wave that is reflected from the cavity in response to radiation of the first radiation radio wave into the cavity.

In some examples, the control unit may be configured to, based on a second radiation radio wave being radiated through the second antenna, detect a second radiation intensity, a second radiation phase, and a second radiation frequency of the second radiation radio wave, and to detect a second reflection intensity, a second reflection phase, and a second reflection frequency of a second reflection radio wave that is reflected from the cavity in response to radiation of the second radiation radio wave into the cavity.

In some examples, the control unit may be configured to determine the intensity, the phase, and the frequency of the radio wave to be generated by the radio wave generator based on the first radiation intensity, the first reflection intensity, the second radiation intensity, and the second reflection intensity.

In some examples, the radio wave generator may include one or more semiconductor oscillators. In some examples, the radio wave generator and the plurality of antennas may be disposed at an upper side of the housing and covered by the housing.

According to another aspect, a method for controlling an oven including a control unit includes receiving cooking information, based on the cooking information, determining a first intensity, a first phase, and a first frequency of a first radio wave to be radiated into a cavity defined in the oven, the first radio wave including a first radiation radio wave to be radiated through a first antenna of the oven, and a second radiation radio wave to be radiated through a second antenna of the oven, based on radiating the first radiation radio wave through the first antenna, detecting a first radiation intensity, a first radiation phase, and a first radiation frequency of the first radiation radio wave, and detecting a first reflection intensity, a first reflection phase, and a first reflection frequency of a first reflection radio wave that is reflected from the cavity in response to radiation of the first radiation radio wave into the cavity, based on radiating the second radiation radio wave through the second antenna, detecting a second radiation intensity, a second radiation phase, and a second radiation frequency of the second radiation radio wave, and detecting a second reflection intensity, a second reflection phase, and a second reflection frequency of a second reflection radio wave that is reflected from the cavity in response to radiation of the second radiation radio wave into the cavity, and determining a second intensity, a second phase, and a second frequency of a second radio wave to be radiated into the cavity based on the first radiation intensity, the first reflection intensity, the second radiation intensity, and the second reflection intensity.

Implementations according to this aspect may include one or more of the following features. For example, receiving the cooking information may include receiving the cooking information through a cooking information input module of the oven, transmitting the cooking information to an input information reception module of the oven, and transferring the cooking information to a radio wave information calculation module of the oven.

In some examples, determining the first intensity, the first phase, and the first frequency of the first radio wave to be radiated into the cavity may include, based on the cooking information, determining first radio wave information related to the first radiation intensity, the first radiation phase, and the first radiation frequency of the first radio wave to be radiation into the cavity through the first antenna, transmitting the determined first radio wave information to a first semiconductor generator module of the oven, based on the cooking information, determining second radio wave information related to the second radiation intensity, the second radiation phase, and the second radiation frequency of the second radio wave to be radiated into the cavity through the second antenna, and transmitting the determined second radio wave information to a second semiconductor generator module of the oven.

In some implementations, determining the first intensity, the first phase, and the first frequency of the first radio wave to be radiated into the cavity further may include generating the first radiation radio wave based on the determined first radio wave information, adjusting the first radiation intensity, the first radiation phase, and the first radiation frequency of the first radiation radio wave based on the determined first radio wave information, and transmitting the adjusted first radiation radio wave to the first antenna.

In some examples, detecting the first radiation intensity, the first radiation phase, the first radiation frequency, the first reflection intensity, the first reflection phase, and the first reflection frequency may include radiating the transmitted first radiation radio wave into the cavity through the first antenna, receiving, by the first antenna, the first reflection radio wave reflected from the cavity in response to radiation of the first radiation radio wave into the cavity, and detecting (i) first incidence information related to the first radiation intensity, the first radiation phase, and the first radiation frequency, and (ii) first reflection information related to the first reflection intensity, the first reflection phase, and the first reflection frequency.

In some implementations, determining the second intensity, the second phase, and the second frequency of the second radio wave to be radiated into the cavity may include determining a first reflection ratio based on comparing the detected first incidence information to the detected first reflection information, determining a number of times that the determined first reflection ratio is greater than or equal to a reference reflection ratio, based on the determined number of times exceeding a reference number of times, determining the first radio wave information to include a reference frequency as the second frequency of the second radio wave to be radiated into the cavity, and transmitting the determined first radio wave information to the first semiconductor generator module.

In some implementations, determining the first intensity, the first phase, and the first frequency of the first radio wave to be radiated into the cavity further may include generating the second radiation radio wave to be radiated into the cavity based on the determined second radio wave information, adjusting the second radiation intensity, the second radiation phase, and the second radiation frequency of the second radiation radio wave based on the determined second radio wave information, and transmitting the adjusted second radiation radio wave to the second antenna.

In some implementations, detecting the second radiation intensity, the second radiation phase, the second radiation frequency, the second reflection intensity, the second reflection phase, and the second reflection frequency may include radiating the transmitted second radiation radio wave into the cavity through the second antenna, receiving, by the second antenna, the second reflection radio wave reflected from the cavity in response to radiation of the second radiation radio wave into the cavity, and detecting (i) second incidence information related to the second radiation intensity, the second radiation phase, and the second radiation frequency, and (ii) second reflection information related to the second reflection intensity, the second reflection phase, and the second reflection frequency.

In some implementations, determining the second intensity, the second phase, and the second frequency of the second radio wave to be radiated into the cavity further may include determining a second reflection ratio based on comparing the detected second incidence information to the detected second reflection information, determining a number of times that the determined second reflection ratio is greater than equal to a reference reflection ratio, based on the determined number of times exceeding a reference number of times, determining the second radio wave information to include a reference frequency as the second frequency of the second radio wave to be radiated into the cavity, and transmitting the determined second radio wave information to the second semiconductor generator module.

In some implementations, the plurality of antennas are spaced apart from each other, and allow radio waves to be radiated into a cooking material in different directions. That is, radio waves may be incident on the cooking material accommodated in a cavity in various directions.

In some examples, where a table on which the cooking material is placed is not rotated, the cooking material accommodated in the cavity may be cooked evenly in such various directions.

In some implementations, the plurality of antennas may be located in a spacing manner such that radio wave radiated through one of the plurality of antennas is not incident on another antenna.

Therefore, the plurality of antennas may not be affected by radio waves radiated from different antennas. Accordingly, electromagnetic interference between the plurality of antennas may be minimized, thereby avoiding damage on each antenna.

In some implementations, the radio wave generator may detect incidence information and reflection information related to intensity, phase, and frequency of radio wave radiated through the antenna and radio wave reflected back to the antenna. The incidence information and reflection information detected by the radio wave generator are transmitted to the control unit, so that a reflection ratio may be calculated based on them.

In some implementations, the control unit may determine whether the cooking material accommodated in the cavity has been effectively heated and cooked by the radiated radio wave using the calculated reflection ratio. When it is determined that the heating and cooking process is inefficiently performed, the control unit may recalculate a frequency of radio wave to be radiated through a predetermined calculation process.

In some implementations, the radio wave generator may generate radio wave corresponding to the frequency recalculated by the control unit, and the generated radio wave may be radiated into the cavity through the antenna.

Accordingly, the frequency of the radiated radio wave may be adjusted according to physical and chemical properties of the cooking material, which may change as the cooking process is carried out. Thus, the cooking material may be effectively cooked and heated.

In some implementations, the radio wave generator may generate radio waves to be radiated through the plurality of antennas, respectively. Similarly, the control unit may calculate radio wave information, which is a basis for the radio wave generator to generate radio waves, with respect to the plurality of antennas, respectively.

This may result in generating and applying radio waves of frequencies, at which the cooking material accommodated in the cavity may be heated and cooked most effectively, in various directions of the cooking material.

Accordingly, the cooking material may be effectively cooked.

In some implementations, with the configuration and the control method, radio waves of different frequencies may be transmitted to the cooking material according to a degree to which the cooking material is to be cooked. In addition, the radio waves of the different frequencies may be transmitted to the cooking material according to different cooking degrees in various directions of the cooking material.

Accordingly, the degree to cook the cooking material may be accurately recognized while the cooking process is in progress.

In some implementations, the radio wave generator may include a first semiconductor generator module and a second semiconductor generator module. The first semiconductor generator module and the second semiconductor generator module may be electrically connected to different antennas, respectively.

In some implementations, the control unit may be provided as a single control unit of the oven. The single control unit may be connected to the radio wave generator. That is, the plurality of semiconductor generator modules provided in the radio wave generator and the plurality of antennas connected thereto are controlled by the single control unit.

In some implementations, the control unit may include a single power module connected to the plurality of semiconductor generator modules and the plurality of antennas.

In some implementations, where each of the antenna and the radio wave generator is provided in plurality, the single control unit may control all of them. This may result in facilitating the control of the antennas and the radio wave generators.

In some implementations, the single control unit may control the plurality of antennas and the plurality of radio wave generators and supply power to them.

Accordingly, the oven may be reduced in size, as compared to a case where a control unit for controlling each antenna and each radio wave generator and a control unit for supplying power to them are separately provided.

DETAILED DESCRIPTION

Figure 1:
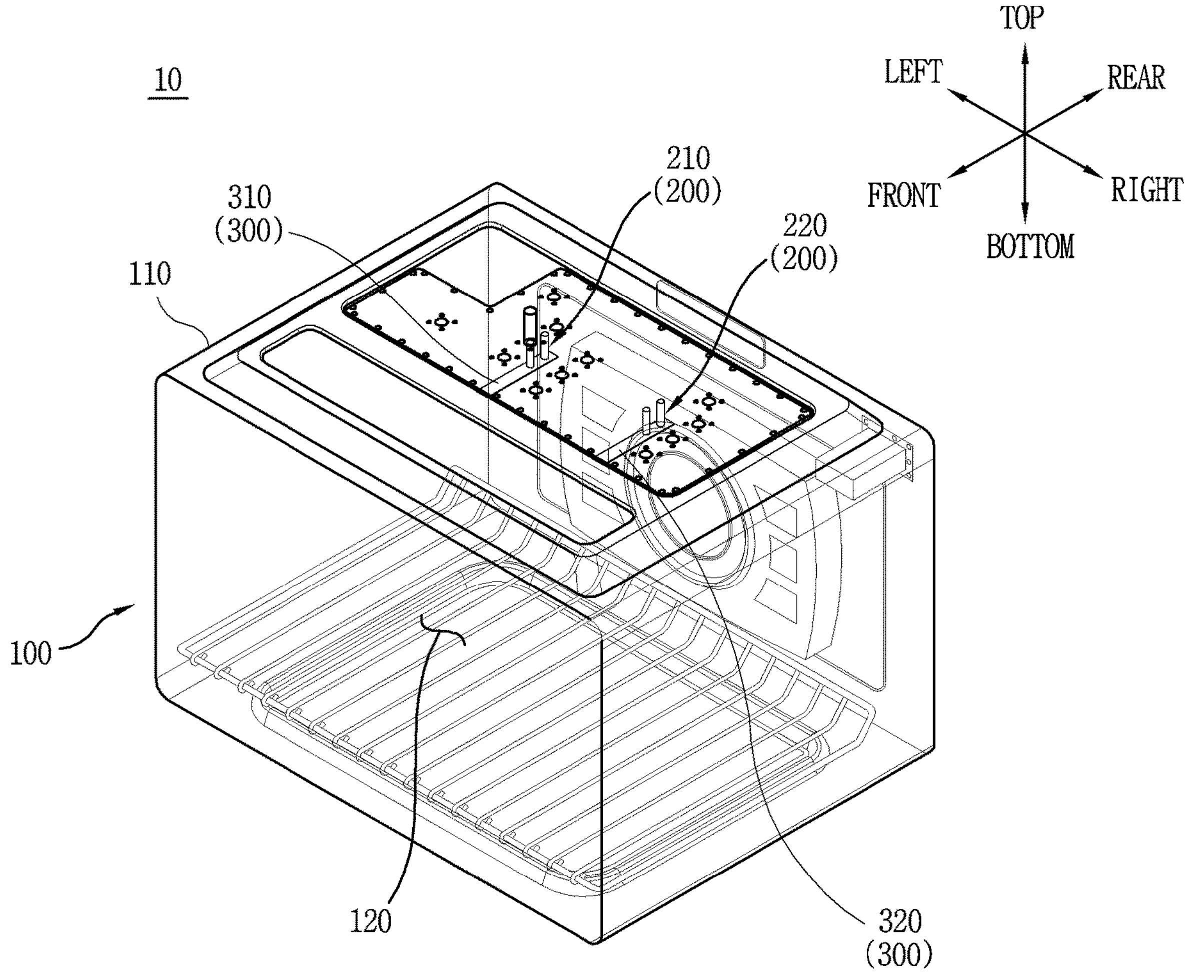
FIG. 1 is a perspective view illustrating an example oven.

Hereinafter, one or more examples of an oven including a plurality of antennas and a control method thereof will be described in detail with reference to the accompanying drawings.

In the following description, in order to clarify the features of the present disclosure, a description of some components will be omitted.

The term “oven” used herein refers to any apparatus which accommodates a cooking material in its inner space and cooks the cooking material in a heating manner. For example, the oven may include a microwave oven, an electric oven, a gas oven, a stove, or the like.

The phrase “electrical connection” may be used when two or more members are connected so that currents may flow or electrical signals may be transferred. The electrical connection may be implemented in a contacting manner between members formed of a conductive material or in a wired manner using a conductive member or the like. In some examples, the electrical connection may be implemented in a wireless manner.

The term “radio wave” may include electromagnetic waves having a wavelength of infrared or higher with a frequency ranging from 3 KHz to 106 MHz. For example, the radio wave may include microwaves.

The terms “top,” “bottom,” “front,” “rear,” “left” and “right” used in the following description will be understood with reference to a coordinate system shown in FIG. 1.

An oven 10 may accommodate a cooking material in a space formed therein. The oven 10 may heat the cooking material using radio waves that are generated in a radio wave generator 200 and transferred into the space through an antenna 300.

The oven 10 includes a plurality of antennas 300. The plurality of antennas 300 may emit (radiate) radio waves at different positions toward a cavity 120 or a cooking material accommodated in the cavity 120. Accordingly, the cooking material may be evenly heated in various directions.

In addition, the oven 10 includes a control unit 400 for controlling the plurality of antennas 300. The control unit 400 is provided in singular, and independently control the plurality of antennas 300.

Figure 2:
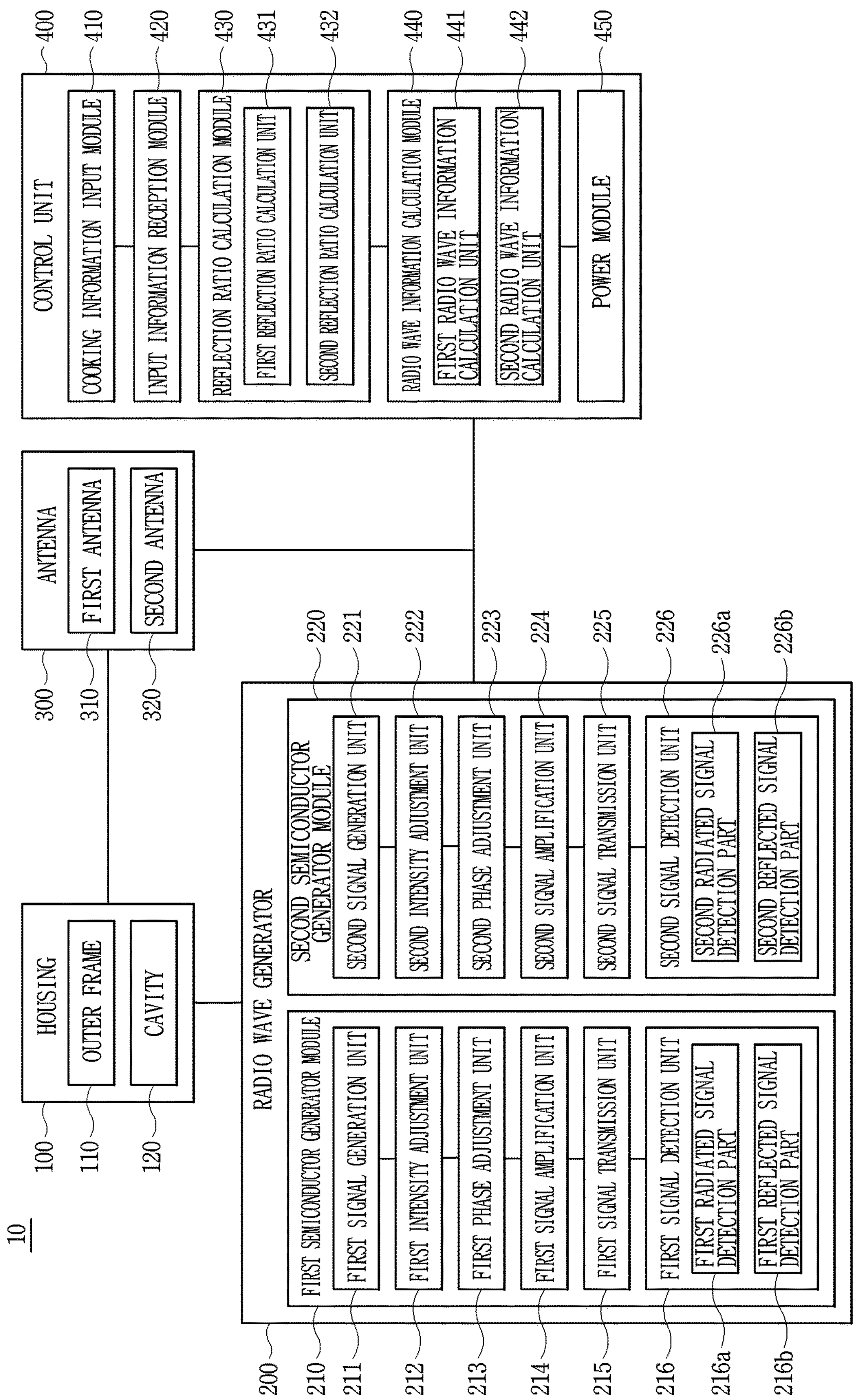
FIG. 2 is a block diagram illustrating example components of an oven.
Figure 3:
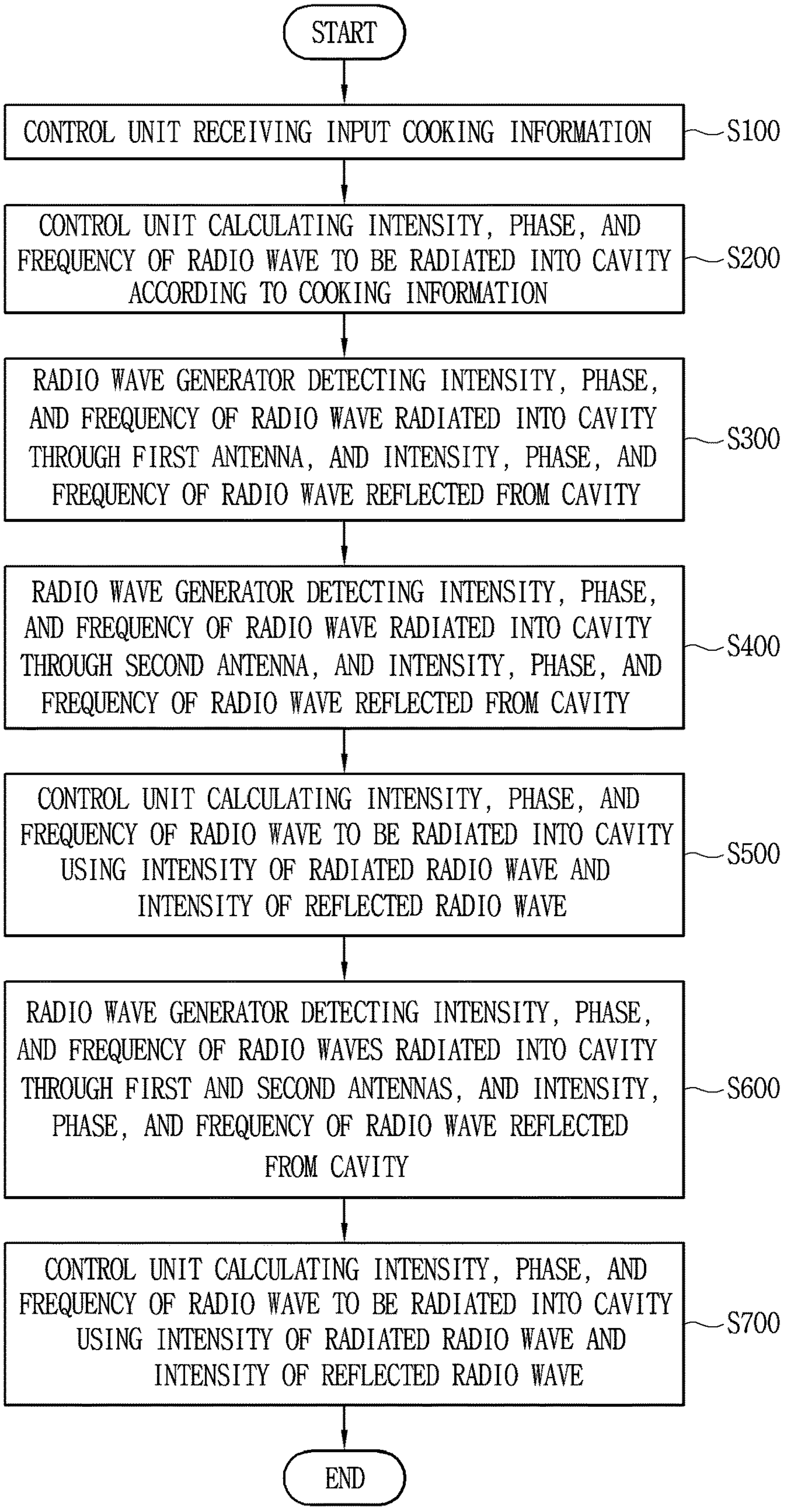
FIG. 3 is a flowchart illustrating example steps of a method for controlling an oven.
Figure 4:
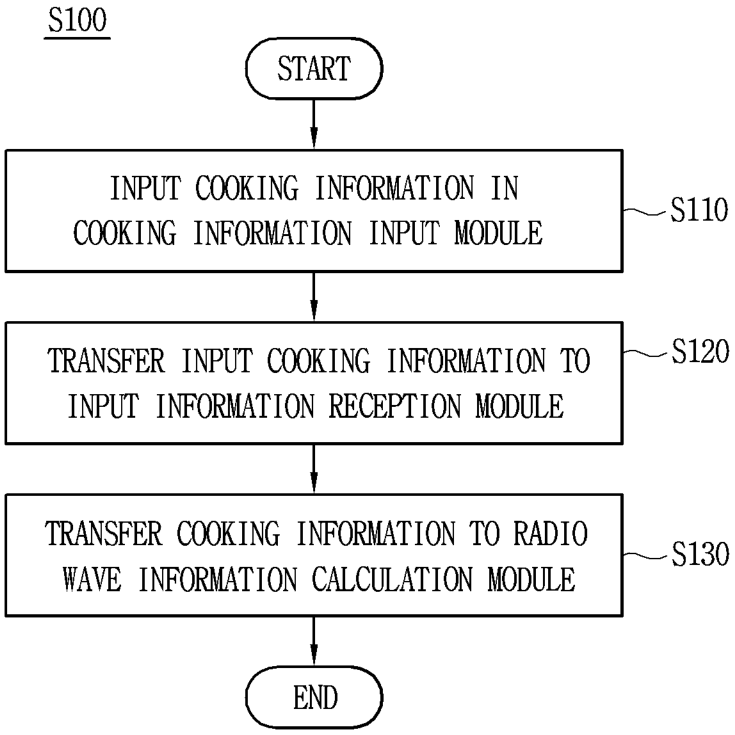
FIG. 4 is a flowchart illustrating an example flow of step S100 in the control method of FIG. 3.
Figure 5:
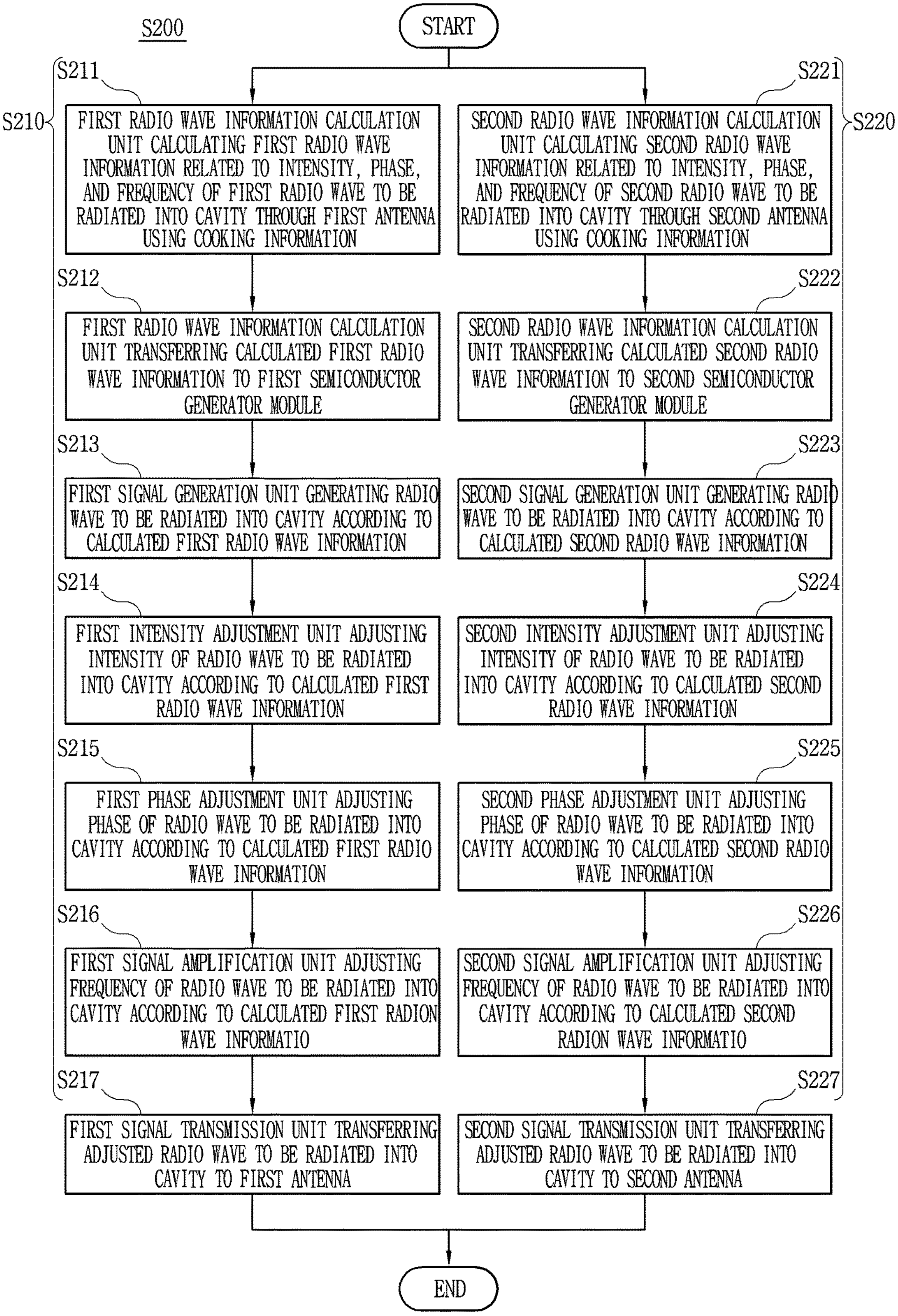
FIG. 5 is a flowchart illustrating an example flow of step S200 in the control method of FIG. 3.
Figure 6:
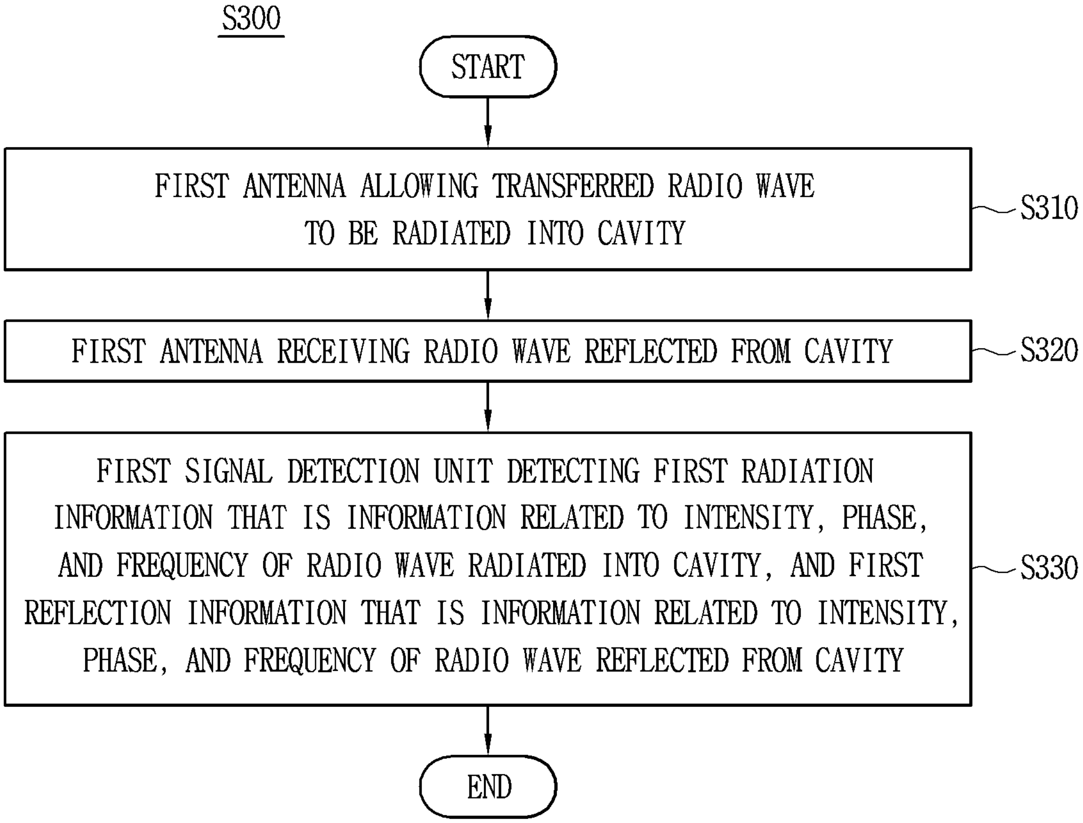
FIG. 6 is a flowchart illustrating an example flow of step S300 in the control method of FIG. 3.
Figure 7:
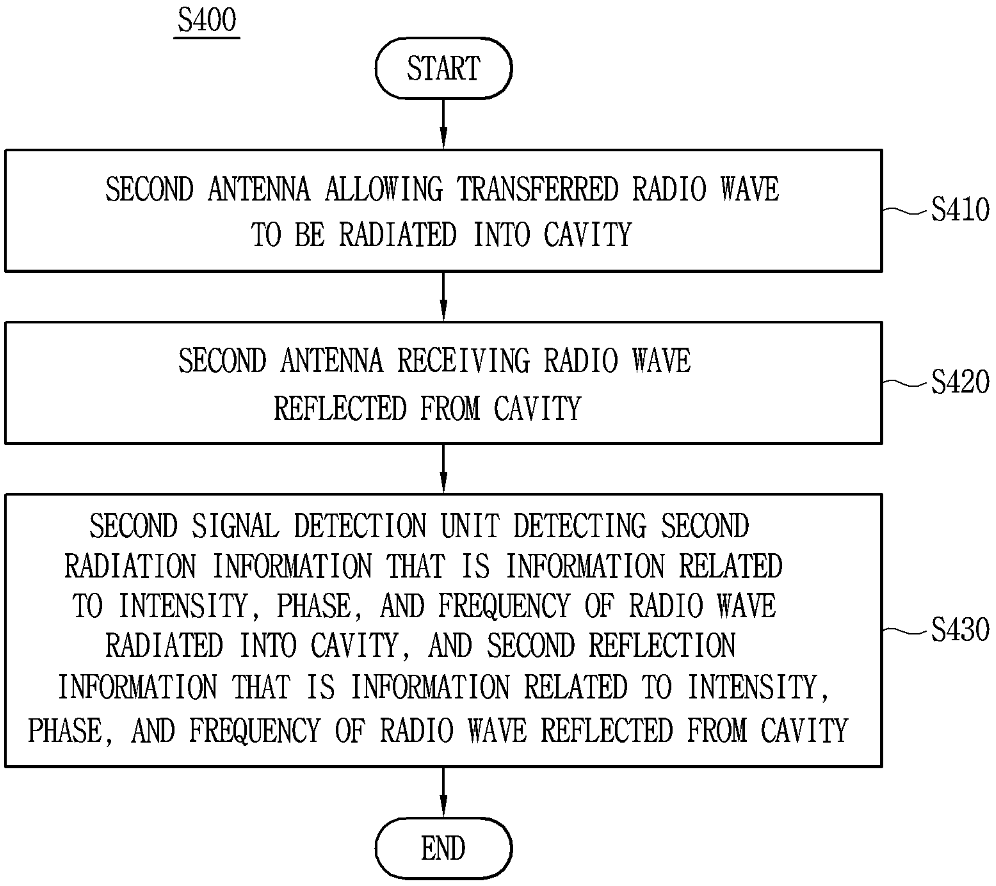
FIG. 7 is a flowchart illustrating an example flow of step S400 in the control method of FIG. 3.
Figure 8:
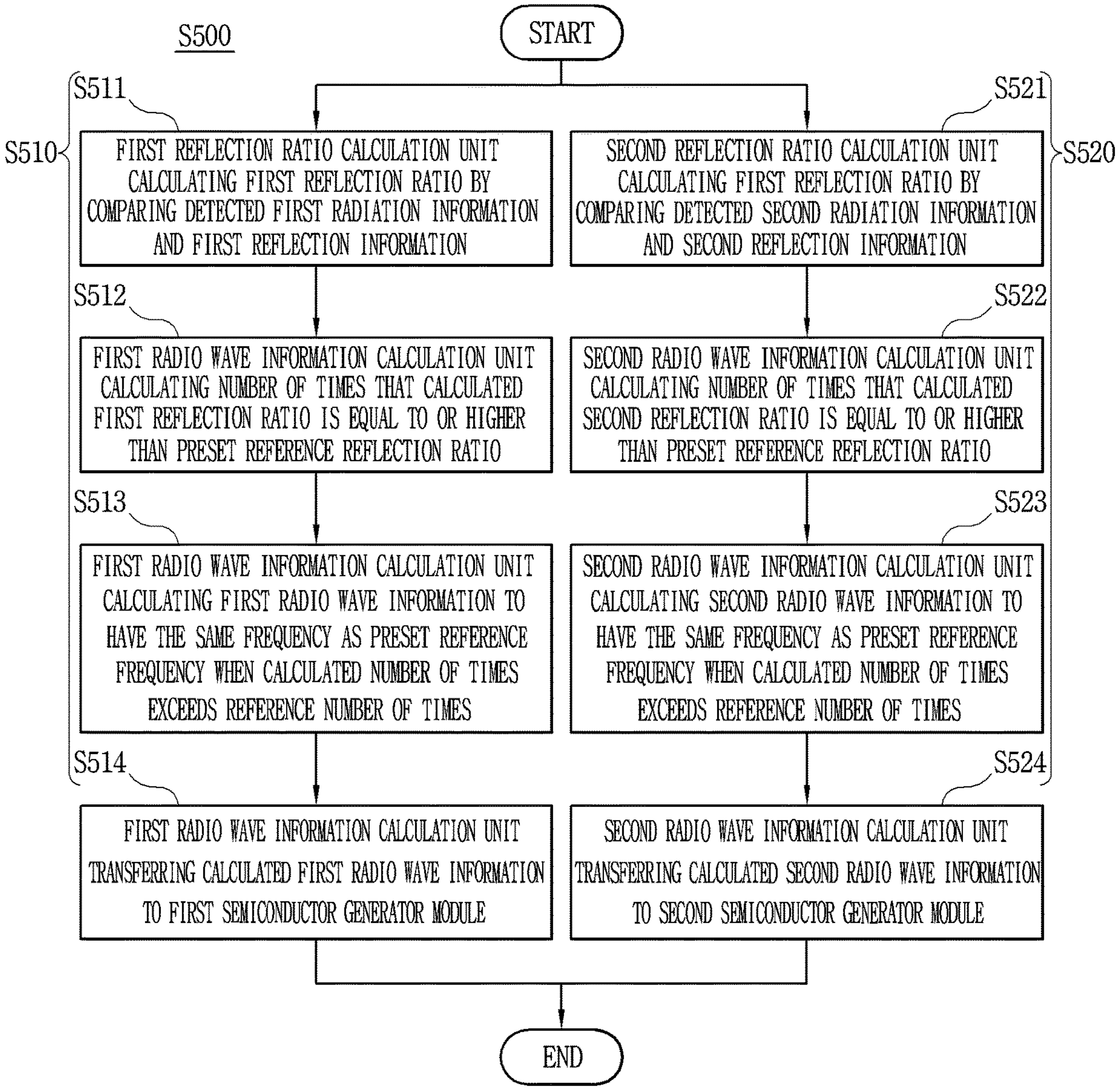
FIG. 8 is a flowchart illustrating an example flow of step S500 in the control method of FIG. 3.
Figure 9:
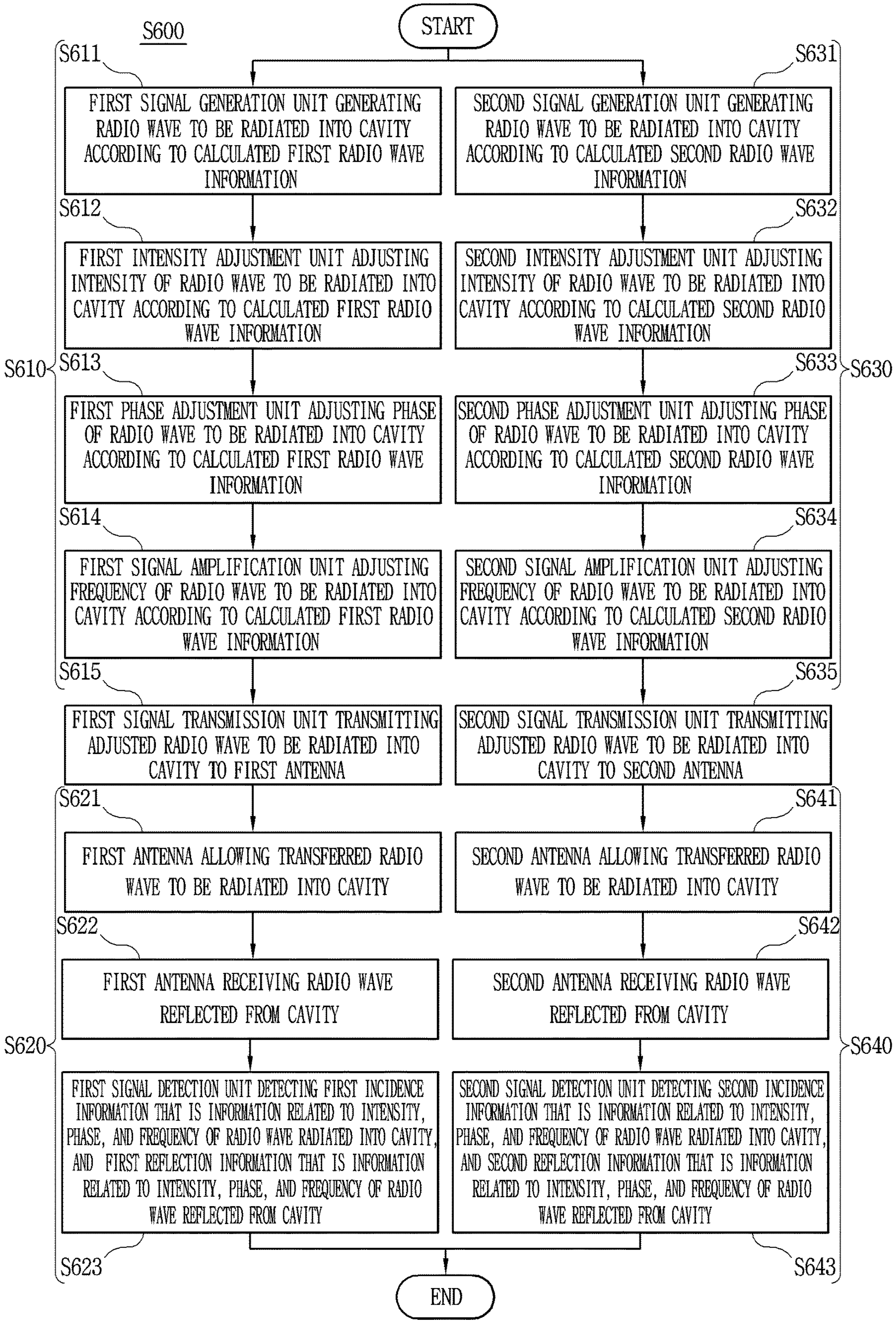
FIG. 9 is a flowchart illustrating an example flow of step S600 in the control method of FIG. 3.

Referring to FIGS. 1 and 2, the oven 10 includes a housing 100, a radio wave generator 200, an antenna 300, and a control unit 400.

The housing 100 defines appearance of the oven 10. The housing 100 may be an externally-exposed portion of the oven 10. The housing 100 functions as a case.

A space is defined inside the housing 100. A cooking material, which is an object to be cooked, may be accommodated in the space. In addition, the space may be provided with a radio wave generator 200 that generates radio waves for heating the cooking material.

In some implementations, the housing 100 is in a polyhedral shape having a rectangular cross section. The housing 100 may be formed in an arbitrary shape capable of accommodating and heating the cooking material therein.

The housing 100 is electrically connected to outside. Accordingly, the radio wave generator 200 accommodated in the housing 100 may be electrically connected to an external power source.

In some implementations, the housing 100 includes an outer frame 110 and a cavity 120.

The outer frame 110 defines an outer side of the housing 100. The outer frame 110 is an externally-exposed portion of the housing 100. Alternatively, the outer frame 110 forms an outline of the housing 100.

A space is defined inside the outer frame 110. A part of the space may be defined as the cavity 120 in which the cooking material is accommodated.

The outer frame 110 may be formed of an insulating material. This is to prevent radio wave emitted from the antenna 300 from being transmitted to the outside of the housing 100. In addition, when a user of the oven 10 is in contact with the outer frame 110, the outer frame 110 is to prevent an accident such as electric shock.

The outer frame 110 may be made of a heat-resistant material. This is to prevent damage due to high heat generated inside the cavity 120.

The radio wave generator 200 and the antenna 300 may be coupled to the outer frame 110. In some implementations, the radio wave generator 200 is located on a rear side of the outer frame 110. In addition, the antenna 300 is located on a top of the outer frame 110. In some implementations, the radio wave generator 200 and the antenna 300 may not be exposed to outside. For instance, the radio wave generator 200 and the antenna 300 may be covered by the outer frame 110.

A cavity 120 is formed inside the outer frame 110.

The cavity 120 is a space in which a cooking material is accommodated. The cavity 120 is enclosed by the outer frame 110.

The cavity 120 may communicate with the outside as a door of the outer frame 110 is opened. The user may open the door to put a cooking material in the cavity 120.

The radio wave generator 200 is located on one side of the cavity 120, for example, on a top of the cavity 120 in some implementations. The radio waves radiated (introduced, emitted, incident) into the cavity 120 may be produced by the radio wave generator 200.

The antenna 300 is provided on one side of the cavity 120, for example, on a top of the cavity 120 in some implementations. The radio waves may be introduced into the cavity 120 through the antenna 300. For example, the antenna 300 may be partially exposed inside the cavity 120.

The radio wave generator 200 may generate radio waves for heating a cooking material placed in the cavity 120. The radio wave generator 200 is electrically connected to an external power source. The connection may be configured in a wired manner using a conductive member. For example, the radio wave generator 200 may include an electric circuit including one or more semiconductor oscillators.

Each component of the radio wave generator 200 may perform its function to be described later in real time and continuously while the oven 10 works.

In other words, while the oven 10 is operating, the radio wave generator 200 may generate and adjust (control) radio waves and detect radiated and reflected radio waves in real time and continuously.

In some implementations, the radio wave generator 200 includes a first semiconductor generator module 210 and a second semiconductor generator module 220.

The first semiconductor generator module 210 generates radio wave to be radiated (or introduced) into the cavity 120 through a first antenna 310. The first semiconductor generator module 210 is electrically connected to the first antenna 310.

The first semiconductor generator module 210 is electrically connected to a power module 450 of the control unit 400. Power to generate radio wave may be supplied from the power module 450.

Information that serves as a reference for the first semiconductor generator module 210 to generate and adjust radio wave is transmitted from the control unit 400. Specifically, the first semiconductor generator module 210 may generate and adjust radio wave according to first radio wave information calculated by a first radio wave information calculation unit 441 of the control unit 400. The first semiconductor generator module 210 and the first radio wave information calculation unit 441 are electrically connected to each other.

The first semiconductor generator module 210 may adjust various types of information related to generated radio wave. For example, the first semiconductor generator module 210 may adjust intensity, phase, and frequency of radio wave to be generated.

The first semiconductor generator module 210 may be provided in any form capable of receiving direct current (DC) power, converting it into a radio wave that has a shape of a wave, and adjusting intensity, phase, and frequency of the converted radio wave. For example, the first semiconductor generator module 210 may be implemented as a solid state power module (SSPM) having a semiconductor oscillator function.

The first semiconductor generator module 210 may receive radio wave information related to radio wave to be generated from the control unit 400. The first semiconductor generator module 210 is electrically connected to the first radio wave information calculation unit 441 of the radio wave information calculation module 440 of the control unit 400.

In some implementations, the first semiconductor generator module 210 includes a first signal generation unit 211, a first intensity adjustment unit 212, a first phase adjustment unit 213, and a first signal amplification unit 214, a first signal transmission unit 215, and a first signal detection unit 216.

The first signal generation unit 211 generates a signal, that is, radio wave, by using power transmitted from the power module 450. The first signal generation unit 211 is electrically connected to the power module 450.

In some implementations, DC power may be applied to the first signal generation unit 211 from the power module 450. In some examples, the first signal generation unit 211 may be provided in the form of an oscillator for converting DC power into radio wave which has a shape of a wave.

The radio wave generated by the first signal generation unit 211 is transmitted to the first intensity adjustment unit 212. The first signal generation unit 211 and the first intensity adjustment unit 212 are electrically connected to each other.

The first intensity adjustment unit 212 adjusts intensity of radio wave to be radiated through the first antenna 310. That is, the first intensity adjustment unit 212 adjusts intensity of the radio wave generated in the first signal generation unit 211. The first intensity adjustment unit 212 is electrically connected to the first signal generation unit 211.

As is known, intensity of a radio wave is proportional to a multiply of a square of an amplitude and a square of a frequency. As will be described later, the oscillation frequency of the radio wave may be controlled in the first signal amplification unit 214. Accordingly, the first intensity adjustment unit 212 may adjust the intensity of the generated radio wave by adjusting an amplitude of the radio wave.

In some implementations, the first intensity adjustment unit 212 may calculate information related to an oscillation frequency of radio wave to be radiated and transfer the calculated information to the first signal amplification unit 214. Information that is calculated by the first intensity adjustment unit 212 to adjust intensity of radio wave may be referred to as "intensity information". The intensity information calculated by the first intensity adjustment unit 212 is transmitted to the first phase adjustment unit 213 and the first signal amplification unit 214.

In some implementations, the first intensity adjustment unit 212 may adjust intensity of radio wave to be radiated by directly adjusting an amplitude and oscillation frequency of the radio wave.

The intensity information calculated by the first intensity adjustment unit 212 or the radio wave whose intensity has been adjusted by the first intensity adjustment unit 212 is transmitted to the first phase adjustment unit 213. The first intensity adjustment unit 212 and the first phase adjustment unit 213 are electrically connected to each other.

The first phase adjustment unit 213 adjusts a phase of the generated radio wave. In other words, the first phase adjustment unit 213 adjusts an element related to a time of the radio wave whose intensity has been adjusted.

The radio wave with the phase adjusted in the first phase adjustment unit 213 is transmitted to the first signal amplification unit 214. The first phase adjustment unit 213 and the first signal amplification unit 214 are electrically connected to each other.

The first signal amplification unit 214 adjusts a frequency of the generated radio wave. That is, the first signal amplification unit 214 adjusts the frequency of the radio wave whose intensity and phase have been adjusted. Accordingly, the intensity of the radio wave may be adjusted more precisely.

The radio wave whose frequency has been adjusted in the first signal amplification unit 214 is transmitted to the first signal transmission unit 215. The first signal amplification unit 214 and the first signal transmission unit 215 are electrically connected to each other.

The first signal transmission unit 215 receives the radio wave whose intensity, phase, and frequency have been adjusted, and transmits it to the first antenna 310. The first signal transmission unit 215 is electrically connected to the first antenna 310.

Accordingly, the generated and adjusted radio wave may be radiated into the cavity 120 according to the first radio wave information generated by the control unit 400.

The first signal detection unit 216 detects the intensity, phase, and frequency of the radio wave introduced in the cavity 120 through the first antenna 310. In addition, the first signal detection unit 216 detects intensity, phase, and frequency of radio wave reflected from the cavity 120 to the first antenna 310.

It will be understood that the incidence (radiation, introduction) and the reflection are carried out in a direction based on the first antenna 310.

The first signal detection unit 216 may be provided in any form capable of detecting radio wave. For example, the first signal detection unit 216 may be implemented as an electromagnetic wave sensor.

Information detected by the first signal detection unit 216 is transmitted to a reflection ratio calculation module 430 of the control unit 400. The first signal detection unit 216 and the reflection ratio calculation module 430 are electrically connected to each other.

The first signal detection unit 216 includes a first radiated signal detection part 216*a* and a first reflected signal detection part 216*b*.

The first radiated signal detection part 216*a* detects radio wave radiated into the cavity 120 through the first antenna 310. The first radiated signal detection part 216*a* may detect information related to intensity, phase, and frequency of the radio wave radiated into the cavity 120 through the first antenna 310.

The first reflected signal detection part 216*b* detects a radio wave incident on the first antenna 310 from the cavity 120. The first reflected signal detection part 216*b* may detect information related to intensity, phase, and frequency of the radio wave incident (reflected) on the first antenna 310 from the cavity 120.

The second semiconductor generator module 220 generates radio wave to be radiated into the cavity 120 through a second antenna 320. The second semiconductor generator module 220 is electrically connected to the second antenna 320.

The second semiconductor generator module 220 is electrically connected to the power module 450 of the control unit 400. Power to generate radio waves may be supplied from the power module 450.

Information that serves as a reference for the second semiconductor generator module 220 to generate and adjust radio wave is transmitted from the control unit 400. Specifically, the second semiconductor generator module 220 may generate and adjust radio wave according to second radio wave information calculated by a second radio wave information calculation unit 442 of the control unit 400. The second semiconductor generator module 220 and the second radio wave information calculation unit 442 are electrically connected to each other.

The second semiconductor generator module 220 may control various types of information related to generated radio waves. For example, the second semiconductor generator module 220 may adjust intensity, phase, and frequency of radio wave to be generated.

The second semiconductor generator module 220 may be provided in any form capable of receiving direct current (DC) power, converting it into radio wave that has a shape of a wave, and adjusting intensity, phase, and frequency of the converted radio wave. For example, the second semiconductor generator module 220 may be implemented as a solid state power module (SSPM) having a semiconductor oscillator function.

The second semiconductor generator module 220 may receive radio wave information related to radio wave to be generated from the control unit 400. The second semiconductor generator module 220 is electrically connected to the second radio wave information calculation unit 442 of the radio wave information calculation module 440 of the control unit 400.

In some implementations, the second semiconductor generator module 220 includes a second signal generation unit 221, a second intensity adjustment unit 222, a second phase adjustment unit 223, and a second signal amplification unit 224, a second signal transmission unit 225, and a second signal detection unit 226.

The second signal generation unit 221 generates a signal, that is, radio wave, by using power transmitted from the power module 450. The second signal generation unit 221 is electrically connected to the power module 450.

In some implementations, DC power may be applied to the second signal generation unit 221 from the power module 450. In some examples, the second signal generation unit 221 may be provided in the form of an oscillator for converting DC power into radio wave that has a shape of a wave.

The radio wave generated by the second signal generation unit 221 is transmitted to the second intensity adjustment unit 222. The second signal generation unit 221 and the second intensity adjustment unit 222 are electrically connected to each other.

The second intensity adjustment unit 222 adjusts intensity of radio wave to be radiated through the second antenna 320. That is, the second intensity adjustment unit 222 adjusts intensity of the radio wave generated in the second signal generation unit 221. The second intensity adjustment unit 222 is electrically connected to the second signal generation unit 221.

As is known, intensity of radio wave is proportional to a multiply of a square of an amplitude and a square of an oscillation frequency. As will be described later, the oscillation frequency of the radio wave may be controlled in the second signal amplification unit 224. Therefore, the second intensity adjustment unit 222 may adjust intensity of the generated radio wave by adjusting an amplitude of the radio wave.

In some implementations, the second intensity adjustment unit 222 may calculate information related to the oscillation frequency of the radio wave to be radiated and transfer the calculated information to the second signal amplification unit 224. Information that is calculated by the second intensity adjustment unit 222 to adjust intensity of radio wave may be referred to as "intensity information". The intensity information calculated by the second intensity adjustment unit 222 is transmitted to the second phase adjustment unit 223 and the second signal amplification unit 224.

In some implementations, the second intensity adjustment unit 222 may adjust intensity of a radio wave to be radiated by directly adjusting an amplitude and oscillation frequency of the radio wave.

The intensity information calculated by the second intensity adjustment unit 222 or the radio wave whose intensity has been adjusted by the second intensity adjustment unit 222 is transmitted to the second phase adjustment unit 223. The second intensity adjustment unit 222 and the second phase adjustment unit 223 are electrically connected to each other.

The second phase adjustment unit 223 adjusts a phase of the generated radio wave. In other words, the second phase adjustment unit 223 adjusts an element related to a time of the radio wave whose intensity has been adjusted.

The radio wave with the phase adjusted in the second phase adjustment unit 223 is transmitted to the second signal amplification unit 224. The second phase adjustment unit 223 and the second signal amplification unit 224 are electrically connected.

The second signal amplification unit 224 adjusts a frequency of the generated radio wave. That is, the second signal amplification unit 224 adjusts the frequency of the radio wave whose intensity and phase have been adjusted. Accordingly, the intensity of the radio wave may be adjusted more precisely.

The radio wave whose frequency has been adjusted in the second signal amplification unit 224 is transmitted to the second signal transmission unit 225. The second signal amplification unit 224 and the second signal transmission unit 225 are electrically connected to each other.

The second signal transmission unit 225 receives the radio wave whose intensity, phase, and frequency have been adjusted, and transmits it to the second antenna 320. The second signal transmission unit 225 is electrically connected to the second antenna 320.

Accordingly, the generated and adjusted radio wave may be radiated into the cavity 120 according to the second radio wave information generated by the control unit 400.

The second signal detection unit 226 detects the intensity, phase, and frequency of the radio wave radiated into the cavity 120 through the second antenna 320. In addition, the second signal detection unit 226 detects intensity, phase, and frequency of radio wave reflected from the cavity 120 to the second antenna 320.

It will be understood that the radiation and the reflection are carried out in a direction based on the second antenna 320.

The second signal detection unit 226 may be provided in any form capable of detecting radio wave. For example, the second signal detection unit 226 may be implemented as an electromagnetic wave sensor.

Information detected by the second signal detection unit 226 is transmitted to the reflection ratio calculation module 430 of the control unit 400. The second signal detection unit 226 and the reflection ratio calculation module 430 are electrically connected to each other.

The second signal detection unit 226 includes a second radiated signal detection part 226*a* and a second reflected signal detection part 226*b*.

The second radiated signal detection part 226*a* detects radio wave radiated into the cavity 120 through the second antenna 320. The second radiated signal detection part 226*a* may detect information related to intensity, phase, and frequency of the radio wave radiated into the cavity 120 through the second antenna 320.

The second reflected signal detection part 226*b* detects radio wave reflected on the second antenna 320 from the cavity 120. The second reflected signal detection part 226*b* may detect information related to intensity, phase, and frequency of the radio wave reflected on the second antenna 320 from the cavity 120.

The antenna 300 receives radio waves that have been generated in the radio wave generator 200 and have adjusted in intensity, phase, and frequency. The antenna 300 is electrically connected to the radio wave generator 200, specifically, the first signal transmission unit 215 and the second signal transmission unit 225.

The radio wave transmitted to the antenna 300 may radiate into the cavity 120. For example, the antenna 300 may be partially or entirely exposed inside the cavity 120.

Information related to radio wave radiated into the cavity 120 through the antenna 300, that is, information related to intensity, phase, and frequency of the radiated radio waves may be detected by the first radiated signal detection part 216*a* and the second radiated signal detection part 226*a*. The antenna 300 is electrically connected to the first radiated signal detection part 216*a* and the second radiated signal detection part 226*a*.

In addition, information related to radio wave reflected from the cavity 120 to the antenna 300, that is, information related to intensity, phase, and frequency of the reflected radio wave may be detected by the first reflected signal detection part 216*b* and the second reflected signal detection part 226*b*. The antenna 300 is electrically connected to the first reflected signal detection part 216*b* and the second reflected signal detection part 226*b*.

The antenna 300 may be provided in plurality. The plurality of antennas 300 may be physically spaced apart from one another. For example, the plurality of antennas 300 may be arranged such that radio wave emitted from one antenna 300 may not be incident on another antenna 300.

In other words, the plurality of antennas 300 may cause radio waves to be introduced into the cavity 120 at different positions. Also, the plurality of antennas 300 may receive radio waves reflected from the cavity 120 at different positions.

Accordingly, the radio waves are incident on a cooking material placed in the cavity 120 at various positions. Accordingly, the cooking material placed in the cavity 120 may be quickly and effectively heated.

In some implementations, the antenna 300 is provided by two in number, including a first antenna 310 and a second antenna 320. The number of antennas 300 may change. In some cases, where more than two antennas 300 are provided, the antennas 300 may be spaced apart from one another.

In some implementations, the semiconductor generator modules 210 and 220 of the radio wave generator 200 may correspond to the number of antennas 300. In some examples, the antennas 310 and 320 are electrically connected to the semiconductor generator modules 210 and 220 of the radio wave generator 200, respectively.

That is, one antenna 300 is electrically connected to one semiconductor generator module 210, 220.

Therefore, radio waves generated and adjusted in the different semiconductor generator modules 210 and 220 may be independently guided into the cavity through the respective antennas 300.

The oven 10 may include the control unit 400. The control unit 400 calculates radio wave information, which is information related to radio wave to be radiated into the cavity 120 through the antenna 300. The radio wave information calculated by the control unit 400 is transmitted to the radio wave generator 200. The control unit 400 and the radio wave generator 200 are electrically connected to each other.

The control unit 400 may be provided in any form capable of inputting, outputting, and calculating information. For example, the control unit 400 may be provided as an electric circuit, a microprocessor or a central processing unit (CPU). In addition, the control unit 400 may be configured to store information. For example, the control unit 400 may include a non-transitory memory device such as a random access memory (RAM), a read-only memory (ROM), a solid state disk (SSD), a hard disk drive (HDD), and the like.

Each component of the control unit 400 may perform its function to be described later in real time and continuously while the oven 10 works.

That is, while the oven 10 is operating, the control unit 400 may receive cooking information, calculate a reflection ratio, calculate radio wave information, and transfer power to other components of the oven 10, in real time and continuously.

In some implementations, the control unit 400 may be provided in singular. The single control unit 400 is electrically connected to each of a plurality of radio wave generators 200. For example, the single control unit 400 is electrically connected to the first semiconductor generator module 210 and the second semiconductor generator module 220, respectively. In some cases, the control unit 400 may include the radio wave generator 200.

In some implementations, the oven 10 may control all of the plurality of radio wave generators 200 through the single control unit 400. Accordingly, a volume of the oven 10 may be decreased and components for electric connection may be reduced, thereby simplifying a structure.

In some implementations, the single control unit 400 may control the plurality of radio wave generators 200 in an independent manner. That is, the single control unit 400 may independently calculate radio wave information for radio waves to be generated in the first semiconductor generator module 210 and the second semiconductor generator module 220, respectively.

Components of the control unit 400 to be described below are electrically connected to one another. The connection may be made in a wired or wireless manner.

In some implementations, the control unit 400 includes a cooking information input module 410, an input information reception module 420, a reflection ratio calculation module 430, a radio wave information calculation module 440, and a power module 450.

The cooking information input module 410 receives cooking information that is input from a user. The user may input cooking information related to a type of food desired to cook or a type of cooking material through the cooking information input module 410.

The cooking information which is input through the cooking information input module 410 may include arbitrary information related to cooking of the cooking material. For example, the cooking information may include information related to a temperature at which the cooking material is to be heated and a time for which the cooking material is to be heated.

When the user inputs cooking information related to a cooking material or a type of food, a heating temperature, a heating time and the like for the cooking material or food may be automatically set according to the cooking material or food.

The cooking information input module 410 may be provided in any form that may be operated by a user to receive cooking information. For example, the cooking information input module 410 may be provided in the form of a button that the user presses to input operation information.

Alternatively, the cooking information input module 410 may be provided in the form of a touch panel or a touch screen through which operation information is input in a touching manner.

The cooking information input by the user through the cooking information input module 410 is transmitted to the input information reception module 420. The cooking information input module 410 is electrically connected to the input information reception module 420.

The input information reception module 420 receives cooking information input through the cooking information input module 410. The input information reception module 420 is electrically connected to the cooking information input module 410.

The input information reception module 420 calculates the input cooking information into a form of information that the radio wave information calculation module 440 may calculate. The input information reception module 420 transmits the calculated information to the radio wave information calculation module 440. The input information reception module 420 is electrically connected to the radio wave information calculation module 440.

The reflection ratio calculation module 430 calculates a reflection ratio that is a ratio of intensity of radio wave radiated into the cavity 120 through the antenna 300 and intensity of radio wave reflected from the cavity 120 toward the antenna 300. The calculated reflection ratio is transmitted to the radio wave information calculation module 440, and is used as basis information for calculating radio wave information.

The reflection ratio calculation module 430 is electrically connected to the radio wave generator 200. Information related to intensity of radiated (incident) radio wave and information related to intensity of reflected radio wave, both detected by the electric wave generator 200, are transferred to the reflection ratio calculation module 430.

The reflection ratio calculation module 430 calculates a reflection ratio that is a ratio of each transmitted information, that is, the intensity of the radiated radio wave and the intensity of the reflected radio wave. Specifically, the reflection ratio may be calculated by a formula of "intensity of radiated radio wave/intensity of reflected radio wave". For example, the calculated reflection ratio may be expressed as a decimal of 1 or less or a decibel (dB).

The calculated reflection ratio is transmitted to the radio wave information calculation module 440 and is used for calculating radio wave information. The reflection ratio calculation module 430 is electrically connected to the radio wave information calculation module 440.

The reflection ratio calculation module 430 may be provided in plurality. The plurality of reflection ratio calculation modules 430 may be electrically connected to the plurality of radio wave generators 200, respectively.

In some implementations, the reflection ratio calculation module 430 includes a first reflection ratio calculation unit 431 and a second reflection ratio calculation unit 432.

The first reflection ratio calculation unit 431 calculates a first reflection ratio that is a reflection ratio at the first antenna 310.

The first reflection ratio calculation unit 431 is electrically connected to the first signal detection unit 216 of the first semiconductor generator module 210. Intensity of radio wave introduced into the cavity 120 through the first antenna 310 and intensity of radio wave reflected to the first antenna 310 from the cavity 120, both of which have been detected by the first signal detection unit 216, are transferred to the first reflection ratio calculation unit 431.

The second reflection ratio calculation unit 432 calculates a second reflection ratio that is a reflection ratio at the second antenna 320.

The second reflection ratio calculation unit 432 is electrically connected to the second signal detection unit 226 of the second semiconductor generator module 220. Intensity of radio wave introduced into the cavity 120 through the second antenna 320 and intensity of radio wave reflected to the second antenna 320 from the cavity 120, both of which have been detected by the second signal detection unit 226, are transferred to the second reflection ratio calculation unit 432.

The radio wave information calculation module 440 calculates radio wave information as information related to radio wave, which is generated and adjusted in the radio wave generator 200 according to the cooking information input by the user so as to be radiated into the cavity 120 through the antenna 300. The radio wave information calculation module 440 is electrically connected to the cooking information input module 410 through the input information reception module 420.

The radio wave information calculation module 440 may calculate the radio wave information by comparing the input cooking information with pre-stored cooking information. That is, the radio wave information calculation module 440 searches for pre-stored cooking information corresponding to the input cooking information, and calculates radio wave information according to intensity, phase, and frequency of radio wave that match the pre-stored cooking information.

In some implementations, the radio wave information calculation module 440 may be electrically connected to a database storing cooking information that matches the intensity, phase, and frequency of a radio wave.

In addition, the radio wave information calculation module 440 calculates the radio wave information using a reflection ratio calculated by the reflection ratio calculation module 430. The radio wave information calculation module 440 is electrically connected to the reflection ratio calculation module 430.

The radio wave information calculation module 440 may calculate radio wave information using the reflection ratio calculated by the reflection ratio calculation module 430. Hereinafter, the process will be described in detail.

The radio wave information calculation module 440 compares the calculated reflection ratio with a preset reference reflection ratio. The reference reflection ratio may be determined to be a minimum value by which it may be determined that a cooking material put in the cavity 120 is not being heated and cooked effectively by radio wave radiated into the cavity 120.

In some implementations, the reference reflection ratio may be determined to be 0.5 dB, which is a value indicating that intensity of reflected radio wave is half of intensity of radiated radio wave, or to be 3 dB, which is a log value of 0.5.

As a result of comparison, when the calculated reflection ratio is less than the reference reflection ratio, it may be determined that the intensity of the reflected radio wave is lower than the intensity of the radiated radio wave. That is, it may be determined that most of the radio wave radiated in the cavity 120 have penetrated the cooking material and are heating the cooking material.

Accordingly, the radio wave information calculation module 440 calculates radio wave information to have the same intensity, phase, and frequency as those of radio wave that is currently radiating into the cavity 120.

As a result of comparison, when the calculated reflection ratio is equal to or higher than the reference reflection ratio, it may be determined that the intensity of the reflected radio wave is higher than the intensity of the radiated radio wave. That is, it may be determined that most of the radio wave radiated in the cavity 120 have reflected back to the antenna 300 without penetrating the cooking material.

At this time, the above situation, that is, the state that the calculated reflection ratio is higher than or equal to the reference reflection ratio, may also occur merely one time due to a simple measurement error, diffuse reflection of radio wave, or the like. Accordingly, the oven 10 repeats those processes several times in order to improve reliability of the calculated radio wave information.

That is, as described above, while the oven 10 is operating, the radio wave generator 200 and the control unit 400 perform their functions in real time and continuously. Accordingly, the radio wave information calculation module 440 calculates the consecutive number of times that the calculated reflection ratio is higher than or equal to the reference reflection ratio, after a time point when the calculated reflection ratio is first higher than or equal to the reference reflection ratio.

In addition, the radio wave information calculation module 440 compares the consecutive number of times that the calculated reflection ratio is equal to or higher than the reference reflection ratio with a preset reference number of times. The reference number of times may be determined to be a maximum value by which it may be determined that the cooking material is effectively heated by radio wave that is currently radiating.

For example, the reference number of times may be three times.

As a result of the comparison, when the calculated number of times is less than or equal to the reference number of times, it may be determined that a measurement error has occurred or heating efficiency has temporarily decreased as the heating of the cooking material continues.

Accordingly, the radio wave information calculation module 440 calculates radio wave information to have the same intensity, phase, and frequency as those of radio wave currently radiating the cavity 120.

In some examples, as a result of the comparison, when the calculated number of times exceeds the reference number of times, it may be determined that the cooking material is not effectively heated by radio wave currently radiating the cavity 120. Therefore, the frequency of the radio wave radiated into the cavity 120 may be changed.

Accordingly, the radio wave information calculation module 440 calculates (or processes) radio wave information to have the same frequency as a preset reference frequency. The reference frequency may be defined as a frequency belonging to a range between a minimum frequency and a maximum frequency that may be generated by the radio wave generator 200. For example, the reference frequency may be determined to be an arbitrary one of frequencies in the range from 300 MHz to 300 GHz.

As described above, while the oven 10 is operating, the radio wave generator 200 and the control unit 400 perform their functions in real time and continuously. Accordingly, the radio wave information calculation module 440 may calculate radio wave information with respect to each of frequencies which are continuously increased from the minimum frequency to the maximum frequency that may be generated by the radio wave generator 200.

That is, in the state, the radio wave information calculation module 440 calculates radio wave information having each of frequencies of all regions that the radio wave generator 200 may generate. Accordingly, frequencies of radio waves that have been generated and adjusted by the radio wave generator 200 and radiated into the cavity 120 through the antenna 300 also correspond to the frequencies of all the regions that may be generated by the radio wave generator 200.

Accordingly, the first signal detection unit 216 and the second signal detection unit 226 detect information related to radiated and reflected radio waves at frequencies of all regions that the radio wave generator 200 may generate. Furthermore, the reflection ratio calculation module 430 calculates reflection ratios at the frequencies of all the regions that the radio wave generator 200 may generate.

As a result, the radio wave information calculation module 440 may compare the reflection ratios calculated with respect to the frequencies of all the regions that the radio wave generator 200 may generate with the reference reflection ratio.

At this time, the radio wave information calculation module 440 calculates radio wave information to have a frequency with the lowest reflection ratio.

That is, after the radio wave radiates into the cavity 120 through the antenna 300, the radio wave information calculation module 440 calculates radio wave information to have the same frequency as a frequency of radio wave with the lowest intensity, which has been reflected from the cavity 120 back to the antenna 300 after radiated into the cavity 120 through the antenna 300. Accordingly, the calculated radio wave information may be information related to radio wave having a frequency at which the largest amount of radio waves penetrates the cooking material.

In some examples, as cooking is carried out, the calculated reflection ratio with respect to the radio wave which has been generated and adjusted according to the radio wave information calculated through those processes may become equal to or higher than the reference reflection ratio.

In this case, the radio wave information calculation module 440 calculates the consecutive number of times that the calculated reflection ratio is higher than or equal to the reference reflection ratio after a time point when the calculated reflection ratio is first higher than or equal to the reference reflection ratio.

In addition, the radio wave information calculation module 440 compares the consecutive number of times that the calculated reflection ratio is equal to or higher than the reference reflection ratio with a preset reference number of times. The reference number of times may be determined to be a maximum value by which it may be determined that the cooking material is effectively heated by radio wave that is currently radiating.

For example, the reference number of times may be three times.

As a result of the comparison, when the calculated number of times is less than or equal to the reference number of times, it may be determined that a measurement error has occurred or heating efficiency has temporarily decreased as the heating of the cooking material continues.

Accordingly, the radio wave information calculation module 440 calculates radio wave information to have the same intensity, phase, and frequency as those of radio wave that is currently radiating into the cavity 120.

As a result of the comparison, when the calculated number of times exceeds the reference number of times, it may be determined that the cooking material is not effectively heated by the radio wave currently radiating into the cavity 120. Therefore, the frequency of the radio wave radiated into the cavity 120 may be changed.

Accordingly, the radio wave information calculation module 440 calculates radio wave information to have the same frequency as a reference frequency. Accordingly, through the aforementioned processes, the reflection ratios at frequencies of all the regions that the radio wave generator 200 may generate are calculated.

As a result, the radio wave information calculation module 440 may re-compare the reflection ratios calculated with respect to the frequencies of all the regions that the radio wave generator 200 may generate with the reference reflection ratio.

At this time, as the cooking process is carried out, a reflection ratio at an arbitrary frequency may exceed the reference reflection ratio. Here, the radio wave information calculation module 440 calculates radio wave information to have the frequency as a frequency at which the lowest reflection ratio has been calculated.

Accordingly, the radio wave information calculation module 440 may calculate, in real time and continuously, radio wave information related to radio wave of a frequency, which is changed in real time as the cooking process is carried out and at which the cooking material may be heated most effectively.

The radio wave information calculated by the radio wave information calculation module 440 is transmitted to the radio wave generator 200. The radio wave information calculation module 440 is electrically connected to the radio wave generator 200.

The radio wave generator 200 generates and adjusts the radio wave according to the received radio wave information and transmits it to the antenna 300. Accordingly, the cooking material placed in the cavity 120 may be heated and cooked according to cooking information input by the user or the calculated reflection ratio.

The radio wave information calculation module 440 may be provided in plurality. The plurality of radio wave information calculation modules 440 may calculate radio wave information for radio waves to be radiated through the plurality of antennas 300, respectively.

In some implementations, the radio wave information calculation module 440 includes a first radio wave information calculation unit 441 and a second radio wave information calculation unit 442. It will be understood that the above-described radio wave information also includes first radio wave information and second radio wave information.

The first radio wave information calculation unit 441 calculates first radio wave information, which is information related to radio wave to be radiated through the first antenna 310.

The first radio wave information calculated by the first radio wave information calculation unit 441 is transmitted to the first semiconductor generator module 210 of the radio wave generator 200. The first radio wave information calculation unit 441 is electrically connected to the first semiconductor generator module 210.

The first radio wave information calculation unit 441 receives a first reflection ratio calculated by the first reflection ratio calculation unit 431, and calculates the first radio wave information using the first reflection ratio. The first radio wave information calculation unit 441 is electrically connected to the first reflection ratio calculation unit 431.

The second radio wave information calculation unit 442 calculates second radio wave information, which is information related to radio wave to be radiated through the second antenna 320.

The second radio wave information calculated by the second radio wave information calculation unit 442 is transmitted to the second semiconductor generator module 220 of the radio wave generator 200. The second radio wave information calculation unit 442 is electrically connected to the second semiconductor generator module 220.

The second radio wave information calculation unit 442 receives a second reflection ratio calculated by the second reflection ratio calculation unit 432, and calculates the second radio wave information using the second reflection ratio. The second radio wave information calculation unit 442 is electrically connected to the second reflection ratio calculation unit 432.

At this time, the first radio wave information calculation unit 441 and the second radio wave information calculation unit 442 may independently calculate the first radio wave information and the second radio wave information.

The power module 450 supplies electric power for each component of the oven 10 to operate. The power module 450 is electrically connected to an external power source.

The power module 450 supplies a current to the radio wave generator 200. The power module 450 and the radio wave generator 200 are electrically connected to each other. As described above, the radio wave generator 200 includes the first semiconductor generator module 210 and the second semiconductor generator module 220.

The power module 450 is electrically connected to the first semiconductor generator module 210 and the second semiconductor generator module 220, respectively.

In some implementations, the current supplied by the power module 450 may be direct current (DC). The current supplied by the power module 450 may be converted into radio wave having a shape of a wave by the first and second signal generation units 211 and 221.

The power module 450 supplies power to each component of the control unit 400.

Specifically, the power module 450 may supply power to the cooking information input module 410, the input information reception module 420, the reflection ratio calculation module 430, and the radio wave information calculation module 440. The power module 450 is electrically connected to the cooking information input module 410, the input information reception module 420, the reflection ratio calculation module 430, and the radio wave information calculation module 440.

The control unit 400 includes a single power module 450. The single power module 450 may be electrically connected to each component included in the oven 10, and may be operate as a power supply for the component.

Accordingly, compared to the case where a plurality of power modules 450 is provided, a reduced volume and a simplified structure may be achieved.

The oven 10 may be controlled through the above-described configuration. In addition, the oven 10 may control intensity, phase, and frequency of radio waves radiated into the cavity 120 through the plurality of antennas 300, respectively.

Accordingly, as the cooking process is performed, radio wave with an optimal frequency for heating a cooking material placed in the cavity 120 may be radiated at various positions. As a result, the cooking process may be carried out quickly and effectively.

Hereinafter, a method for controlling the oven 10 will be described in detail with reference to FIGS. 3 to 10.

In some implementations, the method for controlling the oven 10 includes receiving by the control unit 400 input cooking information (S100), calculating by the control unit 400 intensity, phase, and frequency of radio wave to be radiated into the cavity 120 based on the cooking information (S200), detecting by the radio wave generator 200 intensity, phase, and frequency of radio wave radiated into the cavity 120 through the first antenna 310 and intensity, phase, and frequency of radio wave reflected from the cavity 120 (S300), detecting by the radio wave generator 200 intensity, phase, and frequency of radio wave radiated into the cavity 120 through the second antenna 320 and intensity, phase, and frequency of radio wave reflected from the cavity 120 (S400), calculating by the control unit 400 intensity, phase, and frequency of radio wave to be radiated into the cavity 120 using the detected intensity of the radiated radio wave and the detected intensity of the reflected radio wave (S500), detecting by the radio wave generator 200 intensity, phase, and frequency of the radio waves radiated into the cavity 120 through the first and second antennas 310 and 320 and intensity, phase, and frequency of the radio waves reflected from the cavity 120 (S600), and calculating by the control unit 400 intensity, phase, and frequency of radio wave to be radiated into the cavity 120 using the detected intensity of the incident radio wave and the detected intensity of the reflected radio wave (S700).

In some implementations, the control unit 400 or components of the control unit 400 may perform some or all of the method.

In step S100, the control unit 400 may receive input cooking information.

This step S100 is a step in which the cooking information input module 410 of the control unit 400 receives cooking information input by a user and transfers the received cooking information to the radio wave information calculation module 440 to calculate radio wave information. Hereinafter, this step will be described with reference to FIG. 4.

First, the user inputs cooking information through the cooking information input module 410 (S110). The cooking information may include any information related to a cooking material accommodated in the cavity 120 or any information related to food to be cooked by the user using the accommodated cooking material.

The cooking information input module 410 may be provided in any form that may be operated by a user to input cooking information. For example, the cooking information input module 410 may be provided as a push button, a touch panel, or the like.

The input cooking information is transmitted to the input information reception module 420 (S120). The cooking information input module 410 is electrically connected to the input information reception module 420.

At this time, the input information reception module 420 may calculate or process the received cooking information in the form to be calculated as radio wave information.

The cooking information received in the input information reception module 420 is transmitted to the radio wave information calculation module 440 (S130). The input information reception module 420 is electrically connected to the radio wave information calculation module 440.

In step S200, the control unit 400 may determine an intensity, phase, and frequency of radio wave to be radiated into the cavity 120 according to the cooking information.

The radio wave information calculation module 440 calculates radio wave information, which is information related to intensity, phase, and frequency of radio wave to be radiated from the antenna 300 to the cavity 120 using the transferred cooking information, and generates radio wave accordingly (S200). Hereinafter, this step will be described with reference to FIG. 5.

The radio wave information calculation module 440 calculates radio wave information using the transferred cooking information. As aforementioned, the radio wave information calculation module 440 includes two calculation units including the first radio wave information calculation unit 441 and a second radio wave information calculation unit 442.

The first radio wave information calculation unit 441 and the second radio wave information calculation unit 442 calculate first radio wave information and second radio wave information to be radiated into the cavity 120 from the first antenna 310 and the second antenna 320, respectively.

At this time, the first radio wave information calculation unit 441 and the second radio wave information calculation unit 442 independently calculate the first radio wave information and the second radio wave information. That is, the first radio wave information and the second radio wave information calculated by the first radio wave information calculation unit 441 and the second radio wave information calculation unit 442 do not affect each other.

Accordingly, the following description will be separately given of processes in which the first radio wave information and the second radio wave information are calculated and accordingly radio waves are generated in the first semiconductor generator module 210 and the second semiconductor generator module 220, respectively.

First, a step (S210) in which the first radio wave information calculation unit 441 calculates the first radio wave information, and accordingly the first semiconductor generator module 210 generates radio wave will be described.

The first radio wave information calculation unit 441 calculates radio wave information using the transferred cooking information (S211). The first radio wave information may include information related to intensity, phase, and frequency of first radio wave to be radiated into the cavity 120 through the first antenna 310.

As described above, for the calculation of the first radio wave information, the first radio wave information calculation unit 441 may be electrically connected to a database in which cooking information and radio wave information are stored in a mapped manner.

The first radio wave information calculated by the first radio wave information calculation unit 441 is transferred to the first semiconductor generator module 210 (S212). The first radio wave information calculation unit 441 is electrically connected to the first semiconductor generator module 210.

The first signal generation unit 211 generates radio wave (that is, first radio wave) to be radiated into the cavity 120 according to the transferred first radio wave information (S213). The first radio wave generated by the first signal generation unit 211 is transferred to the first intensity adjustment unit 212. The first signal generation unit 211 and the first intensity adjustment unit 212 are electrically connected to each other.

The first intensity adjustment unit 212 adjusts intensity of the radio wave (i.e., the first radio wave) to be radiated into the cavity 120 according to the calculated first radio wave information (S214). As described above, since the intensity of the radio wave has an amplitude and a frequency as factors, the first intensity adjustment unit 212 may adjust the intensity by adjusting the amplitude or frequency of the generated radio wave.

The first radio wave whose intensity has been adjusted by the first intensity adjustment unit 212 is transferred to the first phase adjustment unit 213. The first intensity adjustment unit 212 and the first phase adjustment unit 213 are electrically connected to each other.

The first phase adjustment unit 213 adjusts phase of the radio wave (i.e., the first radio wave) to be radiated into the cavity 120 according to the calculated first radio wave information (S215).

The first radio wave whose phase has been adjusted by the first phase adjustment unit 213 is transferred to the first signal amplification unit 214. The first phase adjustment unit 213 and the first signal amplification unit 214 are electrically connected to each other.

The first signal amplification unit 214 adjusts frequency of the radio wave (i.e., the first radio wave) to be radiated into the cavity 120 according to the calculated first radio wave information (S216). Accordingly, the process of adjusting the first radio wave to be radiated into the cavity 120 through the first antenna 310 is completed.

The first signal transmission unit 215 transmits the adjusted radio wave, namely, the first radio wave to be radiated into the cavity 120 to the first antenna 310 (S217). The first signal transmission unit 215 and the first antenna 310 are electrically connected to each other.

Hereinafter, a step (S220) in which the second radio wave information calculation unit 442 calculates the second radio wave information, and accordingly the second semiconductor generator module 220 generates radio wave will be described.

The second radio wave information calculation unit 442 calculates radio wave information using the transferred cooking information (S221). The second radio wave information may include information related to intensity, phase, and frequency of the second radio wave to be radiated into the cavity 120 through the second antenna 320.

As described above, for the calculation of the second radio wave information, the second radio wave information calculation unit 442 may be electrically connected to a database in which cooking information and radio wave information are stored in a mapped manner.

The second radio wave information calculated by the second radio wave information calculation unit 442 is transferred to the second semiconductor generator module 220 (S222). The second radio wave information calculation unit 442 is electrically connected to the second semiconductor generator module 220.

The second signal generation unit 221 generates radio wave (that is, second radio wave) to be radiated into the cavity 120 according to the transferred second radio wave information (S223). The second radio wave generated by the second signal generation unit 221 is transferred to the second intensity adjustment unit 222. The second signal generation unit 221 and the second intensity adjustment unit 222 are electrically connected to each other.

The second intensity adjustment unit 222 adjusts intensity of the radio wave (i.e., the second radio wave) to be incident on the cavity 120 according to the calculated second radio wave information (S224). As described above, since the intensity of the radio wave has an amplitude and a frequency as factors, the second intensity adjustment unit 222 may adjust the intensity by adjusting the amplitude or frequency of the generated radio wave.

The second radio wave whose intensity has been adjusted by the second intensity adjustment unit 222 is transferred to the second phase adjustment unit 223. The second intensity adjustment unit 222 and the second phase adjustment unit 223 are electrically connected to each other.

The second phase adjustment unit 223 adjusts phase of the radio wave (i.e., the second radio wave) to be radiated into the cavity 120 according to the calculated second radio wave information (S225).

The second radio wave whose phase has been adjusted by the second phase adjustment unit 223 is transferred to the second signal amplification unit 224. The second phase adjustment unit 223 and the second signal amplification unit 224 are electrically connected to each other.

The second signal amplification unit 224 adjusts frequency of the radio wave (i.e., the second radio wave) to be radiated into the cavity 120 according to the calculated second radio wave information (S226). Accordingly, the process of adjusting the second radio wave to be radiated into the cavity 120 through the second antenna 320 is completed.

The second signal transmission unit 225 transmits the adjusted radio wave, namely, the second radio wave to be radiated into the cavity 120 to the second antenna 320

(S227). The second signal transmission unit 225 and the second antenna 320 are electrically connected to each other.

In step S300, the radio wave generator 200 may detect an intensity, a phase, and a frequency of radio wave radiated into the cavity 120 through the first antenna 310, and intensity, phase, and frequency of radio wave reflected from the cavity 120.

This step S300 is a step in which the first radio wave is radiated from the first antenna 310 to the cavity 120, and the first signal detection unit 216 detects the radiated first radio wave and first reflected radio wave reflected from the cavity 120 to the first antenna 310. Hereinafter, this step will be described with reference to FIG. 6.

First, the first antenna 310 causes the radio wave (i.e., the first radio wave) transferred from the first semiconductor generator module 210 to be radiated into the cavity 120 (S310). The first antenna 310 is electrically connected to the first semiconductor generator module 210.

It will be understood that this step may be performed subsequent to the step S217 described above.

A part of the first radio wave radiated in the cavity 120 penetrates a cooking material and heats the cooking material. Also, the remaining part of the first radio wave is reflected from the cavity 120 back to the first antenna 310.

Accordingly, the first antenna 310 receives the radio wave reflected from the cavity 120 (S320).

At this time, the first signal detection unit 216 detects first incidence information, which is information related to the radio wave radiated into the cavity 120, and first reflection information, which is information related to the radio wave reflected from the cavity 120 (S330).

Specifically, the first radiated signal detection part **216*a* detects the first incidence information related to the intensity, phase, and frequency of the radio wave (i.e., the first radio wave) radiated into the cavity 120 through the first antenna 310. In addition, the first reflected signal detection part 216*b* detects the first reflection information related to the intensity, phase, and frequency of the radio wave reflected from the cavity 120 back to the first antenna 310**.

The first incidence information and the first reflection information detected by the first signal detection unit 216 are transferred to the reflection ratio calculation module 430. The first signal detection unit 216 and the reflection ratio calculation module 430 are electrically connected to each other.

In step S400, the radio wave generator 200 may detect intensity, phase, and frequency of radio wave radiated into the cavity 120 through the second antenna 320, and intensity, phase, and frequency of a radio wave reflected from the cavity 120.

This step S400 is a step in which the second radio wave is radiated from the second antenna 320 to the cavity 120, and the second signal detection unit 226 detects the radiated second radio wave and second reflected radio wave reflected from the cavity 120 to the second antenna 320. Hereinafter, this step will be described with reference to FIG. 7.

First, the second antenna 320 causes the radio wave (i.e., the second radio wave) transferred from the second semiconductor generator module 220 to be radiated into the cavity 120 (S410). The second antenna 320 is electrically connected to the second semiconductor generator module 220.

It will be understood that this step may be performed subsequent to the step S217 described above.

A part of the second radio wave radiated in the cavity 120 penetrate a cooking material and heats the cooking material. Also, the remaining part of the second radio wave is reflected from the cavity 120 back to the second antenna 320.

Accordingly, the second antenna 320 receives the radio wave reflected from the cavity 120 (S420).

At this time, the second signal detection unit 226 detects second incidence information, which is information related to the radio wave radiated in the cavity 120, and second reflection information, which is information related to the radio wave reflected from the cavity 120 (S430).

Specifically, the second radiated signal detection part **226*a* detects the second incidence information related to the intensity, phase, and frequency of the radio wave (i.e., the second radio wave) radiated into the cavity 120 through the second antenna 320. In addition, the second reflected signal detection part 226*b* detects the second reflection information related to the intensity, phase, and frequency of the radio wave reflected from the cavity 120 back to the second antenna 320**.

The second incidence information and the second reflection information detected by the second signal detection unit 226 are transferred to the reflection ratio calculation module 430. The second signal detection unit 226 and the reflection ratio calculation module 430 are electrically connected to each other.

In step S500, the control unit 400 may determine an intensity, a phase, and a frequency of radio wave to be radiated into the cavity 120 using the detected intensity of the radiated radio wave and the detected intensity of the reflected radio wave.

The reflection ratio calculation module 430 calculates the reflection ratio using the detected first incidence information, first reflection information, second incidence information, and second reflection information, and accordingly, the radio wave information calculation module 440 calculates the first radio wave information and the second radio wave information. Hereinafter, this step will be described with reference to FIG. 8.

As described above, in the oven 10, the first radio wave and the second radio wave radiated into the cavity 120 through the first antenna 310 and the second antenna 320 may be independently adjusted.

Accordingly, the following description will be given of this step (S500) by dividing into a step (S510) of adjusting the first radio wave and a step (S520) of adjusting the second radio wave.

First, the step S510 in which the reflection ratio calculation module 430 calculates a first reflection ratio using the first incidence information and the first reflection information and accordingly the radio wave information calculation module 440 calculates the first radio wave information will be described.

The first reflection ratio calculation unit 431 compares the detected first incidence information with the first reflection information to calculate the first reflection ratio (S511). The calculated first reflection ratio may be expressed by the intensity of the radio wave radiated into the cavity 120 through the first antenna 310 and the intensity of the radio wave reflected from the cavity 120 to the first antenna 310.

In some implementations, the calculated first reflection ratio may be expressed as a number in decimal or dB units, as described above.

The first reflection ratio calculated by the first reflection ratio calculation unit 431 is transferred to the first radio wave information calculation unit 441. The first reflection ratio calculation unit 431 and the first radio wave information calculation unit 441 are electrically connected to each other.

The first radio wave information calculation unit 441 calculates the number of times that the calculated first reflection ratio is equal to or higher than a preset reflection ratio (S512).

Specifically, the first radio wave information calculation unit 441 compares the calculated first reflection ratio with a preset reference reflection ratio. The reference reflection ratio, as aforementioned, may be determined to be a minimum value by which it may be determined that a cooking material put in the cavity 120 is not being heated and cooked effectively by radio wave radiated into the cavity 120.

When the calculated first reflection ratio is higher than or equal to the reference reflection ratio, it may be determined that the heating and cooking process of the cooking material is performed inefficiently. Accordingly, the first radio wave information calculation unit 441 calculates the number of times that the case where the calculated first reflection ratio is equal to or higher than the reference reflection ratio consecutively occurs.

When the calculated number of times exceeds the preset reference number of times, the first radio wave information calculation unit 441 calculates (or processes) the first radio wave information to have the same frequency as a preset reference frequency (S513).

That is, when the calculated number of times exceeds the reference number of times, it may not be determined as a simple measurement error but may be determined that the state in which the cooking and heating of the cooking material is inefficiently performed is continued.

Accordingly, the first radio wave information calculation unit 441 calculates (or processes) the first radio wave information to have the same frequency as the reference frequency, in order to derive a frequency at which the cooking material may be effectively heated and cooked. For example, the reference frequency is in the range of all the frequencies that the first signal generation unit 211 may generate.

The first radio wave information calculated by the first radio wave information calculation unit 441 is transferred to the first semiconductor generator module 210 (S514). The first radio wave information calculation unit 441 is electrically connected to the first semiconductor generator module 210.

In some examples, a case where the calculated first reflection ratio is lower than the reference reflection ratio may be considered. Also, a case where the number of times that the calculated first reflection ratio is higher than or equal to the reference reflection ratio is less than the reference number of times may be considered.

In those examples, it may be determined that the cooking material is heated and cooked effectively by the radio wave (i.e., the first radio wave) currently radiated into the cavity 120 through the first antenna 310.

Accordingly, the first radio wave information calculation unit 441 may calculate (or process) the first radio wave information to have the same frequency as that of the radio wave radiated through the first antenna 310.

Next, the step S520 in which the reflection ratio calculation module 430 calculates a second reflection ratio using the second incidence information and the second reflection information and accordingly the radio wave information calculation module 440 calculates the second radio wave information will be described.

The second reflection ratio calculation unit 432 compares the detected second incidence information with the second reflection information to calculate the second reflection ratio (S521). The calculated second reflection ratio may be expressed by the intensity of the radio wave radiated into the cavity 120 through the second antenna 320 and the intensity of the radio wave reflected from the cavity 120 back to the second antenna 320.

In some implementations, the calculated second reflection ratio may be expressed as a number in decimal or dB units, as described above.

The second reflection ratio calculated by the second reflection ratio calculation unit 432 is transferred to the second radio wave information calculation unit 442. The second reflection ratio calculation unit 432 and the second radio wave information calculation unit 442 are electrically connected to each other.

The second radio wave information calculation unit 442 calculates the number of times that the calculated second reflection ratio is equal to or higher than a preset reflection ratio (S522).

Specifically, the second radio wave information calculation unit 442 compares the calculated second reflection ratio with the preset reference reflection ratio. The reference reflection ratio, as aforementioned, may be determined to be a minimum value by which it may be determined that a cooking material put in the cavity 120 is not being heated and cooked effectively by the radio wave radiated into the cavity 120.

When the calculated second reflection ratio is higher than or equal to the reference reflection ratio, it may be determined that the heating and cooking process of the cooking material is performed inefficiently. Accordingly, the second radio wave information calculation unit 442 calculates the number of times that the case where the calculated second reflection ratio is equal to or higher than the reference reflection ratio consecutively occurs.

When the calculated number of times exceeds the preset reference number of times, the second radio wave information calculation unit 442 calculates (or processes) the second radio wave information to have the same frequency as a preset reference frequency (S523).

That is, when the calculated number of times exceeds the reference number of times, it may not be determined as a simple measurement error but may be determined that the state in which the cooking and heating of the cooking material is inefficiently performed is continued.

Accordingly, the second radio wave information calculation unit 442 calculates (or processes) the second radio wave information to have the same frequency as the reference frequency, in order to derive a frequency at which the cooking material may be effectively heated and cooked. For example, the reference frequency is in the range of all the frequencies that the second signal generation unit 221 may generate.

The second radio wave information calculated by the second radio wave information calculation unit 442 is transferred to the second semiconductor generator module 220 (S524). The second radio wave information calculation unit 442 is electrically connected to the second semiconductor generator module 220.

In some examples, a case where the calculated second reflection ratio is lower than the reference reflection ratio may be considered. Also, a case where the number of times that the calculated second reflection ratio is higher than or equal to the reference reflection ratio is less than the reference number of times may be considered.

In those examples, it may be determined that the cooking material is heated and cooked effectively by the radio wave (i.e., the second radio wave) currently radiated into the cavity 120 through the second antenna 320.

Accordingly, the second radio wave information calculation unit 442 may calculate the second radio wave information to have the same frequency as that of the radio wave radiated through the second antenna 320.

In Step S600, the radio wave generator 200 may detect an intensity, a phase, and a frequency of radio waves radiated into the cavity 120 through the first and second antennas 310 and 320, and an intensity, a phase, and a frequency of radio waves reflected from the cavity 120.

The step S600 is a step in which the first and second radio waves generated by the first semiconductor generator module 210 and the second semiconductor generator module 220 are radiated into the cavity 120 through the first antenna 310 and the second antenna 320, and each radiated radio wave and each reflected radio wave are detected. Hereinafter, this step will be described with reference to FIG. 9.

This step is divided into steps S610 and S620 in which the first radio wave generated in the first semiconductor generator module 210 is radiated into the cavity 120 through the first antenna 310 and the radiated radio wave and the reflected radio wave are detected, and steps S630 and S640 in which the second radio wave generated in the second semiconductor generator module 220 is radiated into the cavity 120 through the second antenna 320 and the radiated radio wave and the reflected radio wave are detected.

First, the steps S610 and S620 related to generation, radiation (incidence), reflection, and detection of the first radio wave will be described.

First, the step S610 in which the first semiconductor generator module 210 generates and adjusts the first radio wave according to the calculated first radio wave information will be described.

The first signal generation unit 211 generates the radio wave (that is, the first radio wave) to be radiated into the cavity 120 according to the transferred first radio wave information (S611). The first radio wave generated by the first signal generation unit 211 is transferred to the first intensity adjustment unit 212. The first signal generation unit 211 and the first intensity adjustment unit 212 are electrically connected to each other.

The first intensity adjustment unit 212 adjusts intensity of the radio wave (i.e., the first radio wave) to be radiated into the cavity 120 according to the calculated first radio wave information (S612). As described above, since the intensity of the radio wave has an amplitude and a frequency as factors, the first intensity adjustment unit 212 may adjust the intensity by adjusting the amplitude or frequency of the generated radio wave.

The first radio wave whose intensity has been adjusted by the first intensity adjustment unit 212 is transferred to the first phase adjustment unit 213. The first intensity adjustment unit 212 and the first phase adjustment unit 213 are electrically connected to each other.

The first phase adjustment unit 213 adjusts phase of the radio wave (i.e., the first radio wave) to be radiated into the cavity 120 according to the calculated first radio wave information (S613).

The first radio wave whose phase has been adjusted by the first phase adjustment unit 213 is transferred to the first signal amplification unit 214. The first phase adjustment unit 213 and the first signal amplification unit 214 are electrically connected to each other.

The first signal amplification unit 214 adjusts frequency of the radio wave (i.e., the first radio wave) to be radiated into the cavity 120 according to the calculated first radio wave information (S614). Accordingly, the process of adjusting the first radio wave to be radiated into the cavity 120 through the first antenna 310 is completed.

The first signal transmission unit 215 transmits the adjusted radio wave, namely, the first radio wave to be radiated into the cavity 120 to the first antenna 310 (S615). The first signal transmission unit 215 and the first antenna 310 are electrically connected to each other.

Next, the step S620 in which the first antenna 310 transfers the transferred first radio wave to the cavity 120, and the first signal detection unit 216 detects the radiated radio wave and the reflected radio wave will be described.

The first antenna 310 causes the radio wave (i.e., the first radio wave) transferred from the first semiconductor generator module 210 to be radiated into the cavity 120 (S621). The first antenna 310 is electrically connected to the first semiconductor generator module 210.

A part of the first radio wave radiated into the cavity 120 penetrates a cooking material and heats the cooking material. Also, the remaining part of the first radio wave is reflected from the cavity 120 back to the first antenna 310.

Accordingly, the first antenna 310 receives the radio wave reflected from the cavity 120 (S622).

At this time, the first signal detection unit 216 detects first incidence information, which is information related to the radio wave radiated into the cavity 120, and first reflection information, which is information related to the radio wave reflected from the cavity 120 (S623).

Specifically, the first radiated signal detection part **216*a* detects the first incidence information related to the intensity, phase, and frequency of the radio wave (i.e., the first radio wave) radiated into the cavity 120 through the first antenna 310. In addition, the first reflected signal detection part 216*b* detects the first reflection information related to the intensity, phase, and frequency of the radio wave reflected from the cavity 120 to the first antenna 310**.

The first incidence information and the first reflection information detected by the first signal detection unit 216 are transferred to the reflection ratio calculation module 430. The first signal detection unit 216 and the reflection ratio calculation module 430 are electrically connected to each other.

Next, the steps S630 and S640 related to generation, radiation (incidence), reflection, and detection of the second radio wave will be described.

First, the step S630 in which the second semiconductor generator module 220 generates and adjusts the second radio wave according to the calculated second radio wave information will be described.

The second signal generation unit 221 generates the radio wave (that is, the second radio wave) to be radiated into the cavity 120 according to the transferred second radio wave information (S631). The second radio wave generated by the second signal generation unit 221 is transferred to the second intensity adjustment unit 222. The second signal generation unit 221 and the second intensity adjustment unit 222 are electrically connected to each other.

The second intensity adjustment unit 222 adjusts intensity of the radio wave (i.e., the second radio wave) to be radiated into the cavity 120 according to the calculated second radio wave information (S632). As described above, since the intensity of the radio wave has an amplitude and a frequency as factors, the second intensity adjustment unit 222 may adjust the intensity by adjusting the amplitude or frequency of the generated radio wave.

The second radio wave whose intensity has been adjusted by the second intensity adjustment unit 222 is transferred to the second phase adjustment unit 223. The second intensity adjustment unit 222 and the second phase adjustment unit 223 are electrically connected to each other.

The second phase adjustment unit 223 adjusts phase of the radio wave (i.e., the second radio wave) to be radiated into the cavity 120 according to the calculated second radio wave information (S633).

The second radio wave whose phase has been adjusted by the second phase adjustment unit 223 is transferred to the second signal amplification unit 224. The second phase adjustment unit 223 and the second signal amplification unit 224 are electrically connected to each other.

The second signal amplification unit 224 adjusts frequency of the radio wave (i.e., the second radio wave) to be radiated into the cavity 120 according to the calculated second radio wave information (S634). Accordingly, the process of adjusting the second radio wave to be radiated into the cavity 120 through the second antenna 320 is completed.

The second signal transmission unit 225 transmits the adjusted radio wave, namely, the second radio wave to be radiated into the cavity 120 to the second antenna 320 (S635). The second signal transmission unit 225 and the second antenna 320 are electrically connected to each other.

Next, the step S640 in which the second antenna 320 transfers the transferred second radio wave to the cavity 120, and the second signal detection unit 226 detects the radiated radio wave and the reflected radio wave will be described.

The second antenna 320 causes the radio wave (i.e., the second radio wave) transferred from the second semiconductor generator module 220 to be radiated into the cavity 120 (S641). The second antenna 320 is electrically connected to the second semiconductor generator module 220.

A part of the second radio wave incident on the cavity 120 penetrates a cooking material and heats the cooking material. Also, the remaining part of the second radio wave is reflected from the cavity 120 back to the second antenna 320.

Accordingly, the second antenna 320 receives the radio wave reflected from the cavity 120 (S642).

At this time, the second signal detection unit 226 detects second incidence information, which is information related to the radio wave radiated into the cavity 120, and second reflection information, which is information related to the radio wave reflected from the cavity 120 (S643).

Specifically, the second radiated signal detection part 226*a* detects the second incidence information related to the intensity, phase, and frequency of the radio wave (i.e., the second radio wave) radiated into the cavity 120 through the second antenna 320. In addition, the second reflected signal detection part 226*b* detects the second reflection information related to the intensity, phase, and frequency of the radio wave reflected from the cavity 120 to the second antenna 320.

The second incidence information and the second reflection information detected by the second signal detection unit 226 are transferred to the reflection ratio calculation module 430. The second signal detection unit 226 and the reflection ratio calculation module 430 are electrically connected to each other.

In step S700, the control unit 400 may determine an intensity, a phase, and a frequency of radio wave to be radiated into the cavity 120 using the detected intensity of the radiated radio wave and the detected intensity of the reflected radio wave.

Figure 10:
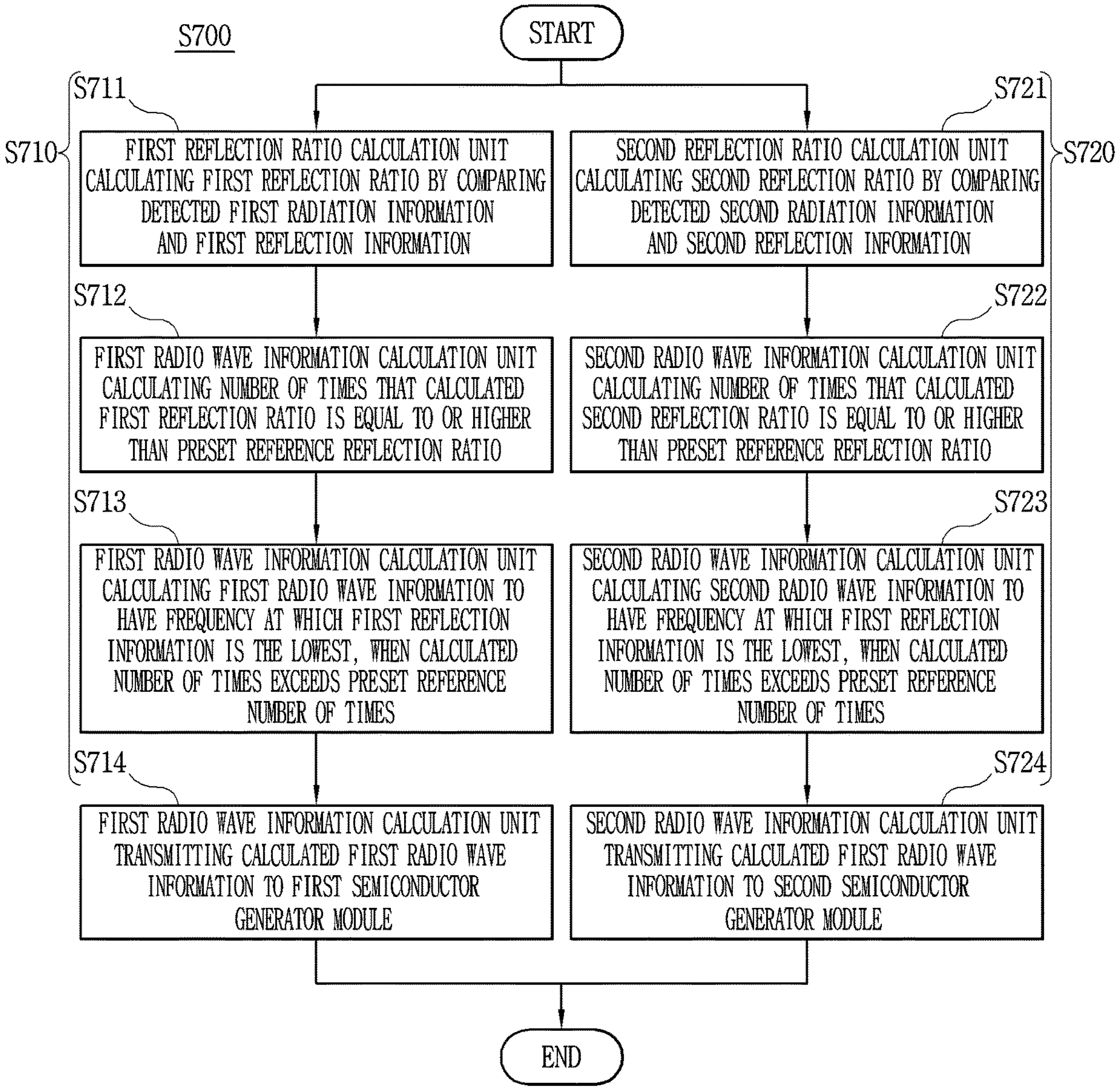
FIG. 10 is a flowchart illustrating an example flow of step S700 in the control method of FIG. 3.

The step S700 is a step in which the reflection ratio calculation module 430 calculates the reflection ratio using the detected first incidence information, first reflection information, second incidence information, and second reflection information, and accordingly, the radio wave information calculation module 440 calculates the first radio wave information and the second radio wave information Hereinafter, this step will be described with reference to FIG. 10.

As described above, in the oven 10, the first radio wave and the second radio wave radiated into the cavity 120 through the first antenna 310 and the second antenna 320 may be independently adjusted.

Accordingly, the following description will be given of the step (S700) by dividing into a step (S710) of adjusting the first radio wave and a step (S720) of adjusting the second radio wave.

First, the step S710 in which the reflection ratio calculation module 430 calculates a first reflection ratio using the first incidence information and the first reflection information and accordingly the radio wave information calculation module 440 calculates the first radio wave information will be described.

The first reflection ratio calculation unit 431 compares the detected first incidence information with the first reflection information to calculate the first reflection ratio (S711). The calculated first reflection ratio may be expressed by the intensity of the radio wave radiated into the cavity 120 through the first antenna 310 and the intensity of the radio wave reflected from the cavity 120 to the first antenna 310.

In some implementations, the calculated first reflection ratio may be expressed as a number in decimal or dB units, as described above.

The first reflection ratio calculated by the first reflection ratio calculation unit 431 is transferred to the first radio wave information calculation unit 441. The first reflection ratio calculation unit 431 and the first radio wave information calculation unit 441 are electrically connected to each other.

The first radio wave information calculation unit 441 calculates the number of times that the calculated first reflection ratio is equal to or higher than a preset reflection ratio (S712).

Specifically, the first radio wave information calculation unit 441 compares the calculated first reflection ratio with the preset reference reflection ratio. The reference reflection ratio, as aforementioned, may be determined to be a minimum value by which it may be determined that a cooking material put in the cavity 120 is not being heated and cooked effectively by the radio wave radiated into the cavity 120.

When the calculated first reflection ratio is higher than or equal to the reference reflection ratio, it may be determined that the heating and cooking process of the cooking material is performed inefficiently. Accordingly, the first radio wave information calculation unit 441 calculates the number of times that the case where the calculated first reflection ratio is equal to or higher than the reference reflection ratio consecutively occurs.

When the calculated number of times exceeds the preset reference number of times, the first radio wave information calculation unit 441 calculates the first radio wave information to have a frequency at which the first reflection information is the lowest (the minimum) (S713).

That is, when the calculated number of times exceeds the reference number of times, it may not be determined as a simple measurement error but may be determined that the state in which the cooking and heating of the cooking material is inefficiently performed is continued.

In the previous step S500, the first reflection ratio has been calculated with respect to the frequencies of all the regions.

Accordingly, the first radio wave information calculation unit 441 calculates the first radio wave information to have the frequency at which the first reflection information is the lowest, among those frequencies of all the regions. That is, the calculated first radio wave information includes information related to a frequency at which the reflected radio wave after being radiated has the lowest intensity.

The first radio wave information calculated by the first radio wave information calculation unit 441 is transferred to the first semiconductor generator module 210 (S714). The first radio wave information calculation unit 441 is electrically connected to the first semiconductor generator module 210.

In some examples, a case where the calculated first reflection ratio is lower than the reference reflection ratio may be considered. Also, a case where the number of times that the calculated first reflection ratio is higher than or equal to the reference reflection ratio is less than the reference number of times may be considered.

In those examples, it may be determined that the cooking material is heated and cooked effectively by the radio wave (i.e., the first radio wave) currently radiated into the cavity 120 through the first antenna 310.

Accordingly, the first radio wave information calculation unit 441 may calculate the first radio wave information to have the same frequency as that of the radio wave radiated through the first antenna 310.

Next, the step S720 in which the reflection ratio calculation module 430 calculates a second reflection ratio using the second incidence information and the second reflection information and accordingly the radio wave information calculation module 440 calculates the second radio wave information will be described.

The second reflection ratio calculation unit 432 compares the detected second incidence information with the second reflection information to calculate the second reflection ratio (S721). The calculated second reflection ratio may be expressed by the intensity of the radio wave radiated into the cavity 120 through the second antenna 320 and the intensity of the radio wave reflected from the cavity 120 to the second antenna 320.

In some implementations, the calculated second reflection ratio may be expressed as a number in decimal or dB units, as described above.

The second reflection ratio calculated by the second reflection ratio calculation unit 432 is transferred to the second radio wave information calculation unit 442. The second reflection ratio calculation unit 432 and the second radio wave information calculation unit 442 are electrically connected to each other.

The second radio wave information calculation unit 442 calculates the number of times that the calculated second reflection ratio is equal to or higher than the preset reflection ratio (S722).

Specifically, the second radio wave information calculation unit 442 compares the calculated second reflection ratio with the preset reference reflection ratio. The reference reflection ratio, as aforementioned, may be determined to be a minimum value by which it may be determined that a cooking material put in the cavity 120 is not being heated and cooked effectively by the radio wave radiated into the cavity 120.

When the calculated second reflection ratio is higher than or equal to the reference reflection ratio, it may be determined that the heating and cooking process of the cooking material is performed inefficiently. Accordingly, the second radio wave information calculation unit 442 calculates the number of times that the case where the calculated second reflection ratio is equal to or higher than the reference reflection ratio consecutively occurs.

When the calculated number of times exceeds the preset reference number of times, the second radio wave information calculation unit 442 calculates the second radio wave information to have a frequency at which the second reflection information is the lowest (S723).

That is, when the calculated number of times exceeds the reference number, it may not be determined a simple measurement error but may be determined that the state in which the cooking and heating of the cooking material is inefficiently performed.

In the previous step S500, the first reflection ratio has been calculated with respect to the frequencies of all the regions.

Accordingly, the second radio wave information calculation unit 442 calculates the second radio wave information to have a frequency at which the second reflection information is the lowest, among those frequencies of all the regions. That is, the calculated second radio wave information includes information related to a frequency at which the reflected radio wave after being incident has the lowest intensity.

The second radio wave information calculated by the second radio wave information calculation unit 442 is transferred to the second semiconductor generator module 220 (S724). The second radio wave information calculation unit 442 is electrically connected to the second semiconductor generator module 220.

In some examples, a case where the calculated second reflection ratio is lower than the reference reflection ratio may be considered. Also, a case where the number of times that the calculated second reflection ratio is higher than or equal to the reference reflection ratio is less than the reference number of times may be considered.

In those examples, it may be determined that the cooking material is heated and cooked effectively by the radio wave (i.e., the second radio wave) currently radiated into the cavity 120 through the second antenna 320.

Accordingly, the second radio wave information calculation unit 442 may calculate the second radio wave information to have the same frequency as that the radio wave radiated through the second antenna 320.

Although described above with reference to the various implementations of the present disclosure, it will be understood that those skilled in the art may variously modify and change the present disclosure without departing from the scope of the present disclosure as set forth in the claims below.

What is claimed is:

1. A method for controlling an oven including an electric circuit, a microprocessor, or a central processing unit (CPU), the method comprising:

receiving cooking information;

based on the cooking information, determining a first intensity, a first phase, and a first frequency of a first radio wave to be radiated into a cavity defined in the oven, the first radio wave comprising a first radiation radio wave to be radiated through a first antenna of the oven, and a second radiation radio wave to be radiated through a second antenna of the oven;

based on radiating the first radiation radio wave through the first antenna, detecting a first radiation intensity, a first radiation phase, and a first radiation frequency of the first radiation radio wave, and detecting a first reflection intensity, a first reflection phase, and a first reflection frequency of a first reflection radio wave that is reflected from the cavity in response to radiation of the first radiation radio wave into the cavity;

based on radiating the second radiation radio wave through the second antenna, detecting a second radiation intensity, a second radiation phase, and a second radiation frequency of the second radiation radio wave, and detecting a second reflection intensity, a second reflection phase, and a second reflection frequency of a second reflection radio wave that is reflected from the cavity in response to radiation of the second radiation radio wave into the cavity; and determining a second intensity, a second phase, and a second frequency of a second radio wave to be radiated into the cavity based on the first radiation intensity, the first reflection intensity, the second radiation intensity, and the second reflection intensity, wherein determining the second intensity, the second phase, and the second frequency of the second radio wave to be radiated into the cavity comprises:

determining a reflection ratio at a specific frequency based on the first radiation intensity, the first reflection intensity, the second radiation intensity, and the second reflection intensity, comparing the reflection ratio to a reference reflection ratio, wherein the reference reflection ratio is a predetermined minimum value that provides a non-effective heating and cooking of a material in the cavity by radiation of a radio wave into the cavity, and determining the second frequency of the second radio wave to be radiated into the cavity based on a result of the comparing of the reflection ratio to the reference reflection ratio, wherein the result of the comparing of the reflection ratio to the reference reflection ratio comprises:

a determination that the reflection ratio is less than the reference reflection ratio such that the radio wave radiated into the cavity penetrates the material in the cavity and heats the material in the cavity, and a determination that the reflection ratio is equal to or higher than the reference reflection ratio such that the radio wave radiated into the cavity reflects back to the first and second antennas without penetrating the cooking material, and wherein the method further comprises:

calculating a consecutive number of times that the reflection ratio is higher than or equal to the reference reflection ratio after a first time point when the reflection ratio is higher than or equal to the reference reflection ratio, and comparing the consecutive number of times to a predetermined reference number of times, the predetermined reference number of times being defined as a maximum value that is predetermined that the cooking material is heated by the radio wave radiated into the cavity.

2. The method of claim 1, further comprising transferring the cooking information.

3. The method of claim 1, wherein determining the first intensity, the first phase, and the first frequency of the first radio wave to be radiated into the cavity comprises:

based on the cooking information, determining first radio wave information related to the first radiation intensity, the first radiation phase, and the first radiation frequency of the first radio wave to be radiation into the cavity through the first antenna;

transmitting the first radio wave information to a first semiconductor generator module of the oven;

based on the cooking information, determining second radio wave information related to the second radiation intensity, the second radiation phase, and the second radiation frequency of the second radio wave to be radiated into the cavity through the second antenna; and transmitting the second radio wave information to a second semiconductor generator module of the oven.

4. The method of claim 3, wherein determining the first intensity, the first phase, and the first frequency of the first radio wave to be radiated into the cavity further comprises:

generating the first radiation radio wave based on the first radio wave information;

adjusting the first radiation intensity, the first radiation phase, and the first radiation frequency of the first radiation radio wave based on the first radio wave information; and transmitting the first radiation radio wave to the first antenna.

5. The method of claim 4, wherein detecting the first radiation intensity, the first radiation phase, the first radiation frequency, the first reflection intensity, the first reflection phase, and the first reflection frequency comprises:

radiating the first radiation radio wave into the cavity through the first antenna;

receiving, by the first antenna, the first reflection radio wave reflected from the cavity in response to radiation of the first radiation radio wave into the cavity; and detecting (i) first incidence information related to the first radiation intensity, the first radiation phase, and the first radiation frequency, and (ii) first reflection information related to the first reflection intensity, the first reflection phase, and the first reflection frequency.

6. The method of claim 5, wherein determining the second intensity, the second phase, and the second frequency of the second radio wave to be radiated into the cavity comprises:

determining a first reflection ratio based on comparing the first incidence information to the first reflection information;

determining a number of times that the first reflection ratio is greater than or equal to the reference reflection ratio;

based on the number of times exceeding a reference number of times, determining the first radio wave information to include a reference frequency as the second frequency of the second radio wave to be radiated into the cavity; and transmitting the first radio wave information to the first semiconductor generator module.

7. The method of claim 3, wherein determining the first intensity, the first phase, and the first frequency of the first radio wave to be radiated into the cavity further comprises:

generating the second radiation radio wave to be radiated into the cavity based on the second radio wave information;

adjusting the second radiation intensity, the second radiation phase, and the second radiation frequency of the second radiation radio wave based on the second radio wave information; and transmitting the second radiation radio wave to the second antenna.

8. The method of claim 7, wherein detecting the second radiation intensity, the second radiation phase, the second radiation frequency, the second reflection intensity, the second reflection phase, and the second reflection frequency comprises:

radiating the second radiation radio wave into the cavity through the second antenna;

receiving, by the second antenna, the second reflection radio wave reflected from the cavity in response to radiation of the second radiation radio wave into the cavity; and detecting (i) second incidence information related to the second radiation intensity, the second radiation phase, and the second radiation frequency, and (ii) second reflection information related to the second reflection intensity, the second reflection phase, and the second reflection frequency.

9. The method of claim 8, wherein determining the second intensity, the second phase, and the second frequency of the second radio wave to be radiated into the cavity further comprises:

determining a second reflection ratio based on comparing the second incidence information to the second reflection information;

determining a number of times that the second reflection ratio is greater than or equal to the reference reflection ratio;

based on the number of times exceeding a reference number of times, determining the second radio wave information to include a reference frequency as the second frequency of the second radio wave to be radiated into the cavity; and transmitting the second radio wave information to the second semiconductor generator module.

* * * * *